(12) United States Patent
Ohtsuji et al.

(10) Patent No.: US 11,523,366 B2
(45) Date of Patent: Dec. 6, 2022

(54) TERMINAL NUMBER ESTIMATING SYSTEM, TERMINAL SPECIFYING SYSTEM, TERMINAL NUMBER ESTIMATING DEVICE, TERMINAL NUMBER SPECIFYING DEVICE, AND PROCESSING METHOD

(71) Applicant: NEC Corporation, Tokyo (JP)

(72) Inventors: Taichi Ohtsuji, Tokyo (JP); Toshiki Takeuchi, Tokyo (JP); Masaki Kitsunezuka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 178 days.

(21) Appl. No.: 16/973,614

(22) PCT Filed: Jun. 12, 2019

(86) PCT No.: PCT/JP2019/023248
§ 371 (c)(1),
(2) Date: Dec. 9, 2020

(87) PCT Pub. No.: WO2019/240160
PCT Pub. Date: Dec. 19, 2019

(65) Prior Publication Data
US 2021/0250894 A1 Aug. 12, 2021

(30) Foreign Application Priority Data
Jun. 12, 2018 (JP) .............................. JP2018-112198

(51) Int. Cl.
*H04W 64/00* (2009.01)
*G01S 5/02* (2010.01)
*G06F 17/14* (2006.01)

(52) U.S. Cl.
CPC ......... *H04W 64/006* (2013.01); *G01S 5/0236* (2013.01); *G06F 17/141* (2013.01)

(58) Field of Classification Search
CPC ... H04W 64/006; G01S 5/0236; G06F 17/141
(Continued)

(56) References Cited

U.S. PATENT DOCUMENTS

2009/0305665 A1 12/2009 Kennedy et al.
2013/0184008 A1 7/2013 Terada et al.
(Continued)

FOREIGN PATENT DOCUMENTS

JP 2011-523832 A 8/2011
JP 2017-108315 A 6/2017
(Continued)

OTHER PUBLICATIONS

International Search Report for PCT Application No. PCT/JP2019/023248, dated Aug. 13, 2019.
(Continued)

*Primary Examiner* — Allen C Wong
(74) *Attorney, Agent, or Firm* — Sughrue Mion, PLLC

(57) ABSTRACT

A terminal number estimating system includes: a plurality of receivers that receive a wireless signal transmitted from a plurality of terminal devices by frequency-division multiple access; a Fourier transform unit that performs a discrete Fourier transform on each wireless signal received by the plurality of reception means and outputs a discrete Fourier coefficient; and a terminal number estimation unit that estimates a position of each terminal device by clustering a resource block of each wireless signal based on each discrete Fourier coefficient.

6 Claims, 12 Drawing Sheets

(58) Field of Classification Search
USPC .................................................... 455/456.1
See application file for complete search history.

(56) References Cited

U.S. PATENT DOCUMENTS

| | | | |
|---|---|---|---|
| 2015/0119062 A1* | 4/2015 | Aoki | H04W 72/082 |
| | | | 455/452.1 |
| 2015/0237164 A1* | 8/2015 | Mohammad Mirzaei | ................... |
| | | | H04W 4/33 |
| | | | 709/203 |
| 2021/0076231 A1* | 3/2021 | Farhadi | H04W 24/02 |

FOREIGN PATENT DOCUMENTS

| WO | 2012/108539 A1 | 8/2012 |
|---|---|---|
| WO | 2012/159886 A1 | 11/2012 |
| WO | 2013/049995 A1 | 4/2013 |

OTHER PUBLICATIONS

Matsuno, Hiromi et al., "An approach of frequency sharing between heterogeneous radio systems for 5th generation mobile communication systems", IEICE Technical Report 2016, Oct. 13, 2016, pp. 197-202, vol. 116, No. 257, RCS2016-188(Oct. 2016), The Institute of Electronics, Information and Communication Engineers.

* cited by examiner

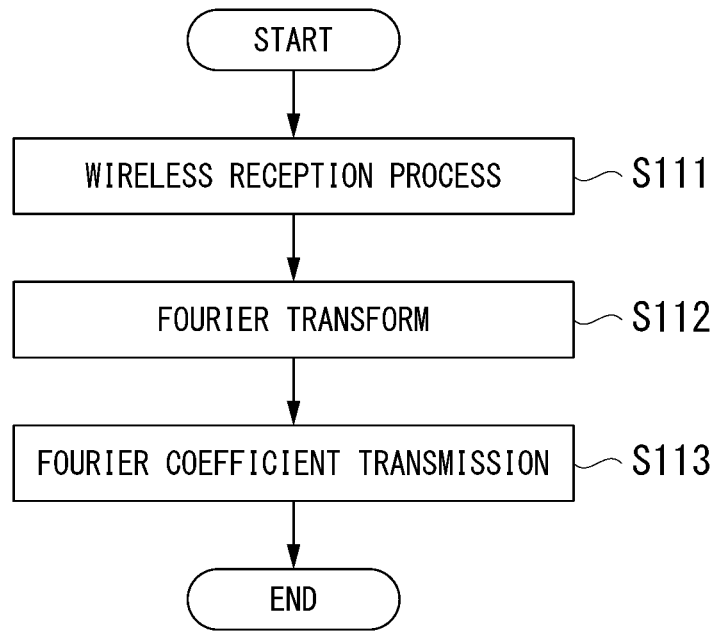
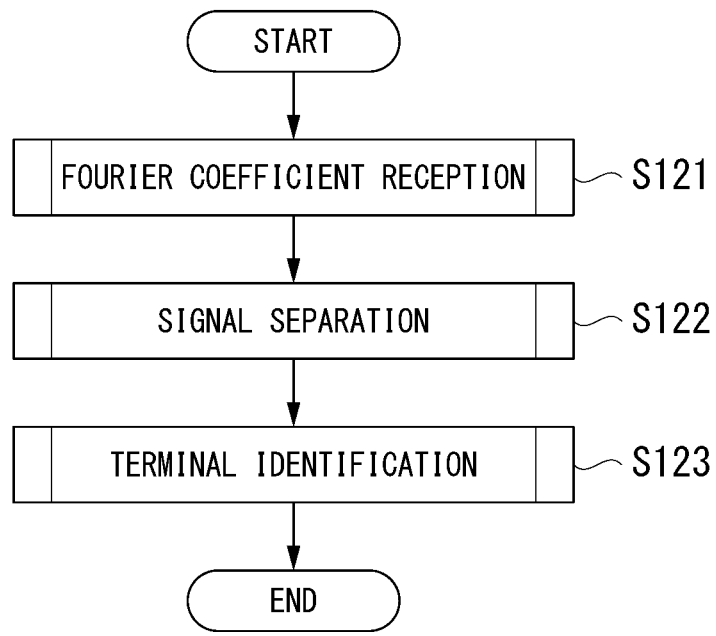

TERMINAL NUMBER ESTIMATING SYSTEM, TERMINAL SPECIFYING SYSTEM, TERMINAL NUMBER ESTIMATING DEVICE, TERMINAL NUMBER SPECIFYING DEVICE, AND PROCESSING METHOD

This application is a National Stage Entry of PCT/JP2019/023248 filed on Jun. 12, 2019, which claims priority from Japanese Patent Application 2018-112198 filed on Jun. 12, 2018, the contents of all of which are incorporated herein by reference, in their entirety.

TECHNICAL FIELD

The present invention relates to a terminal number estimating system, a terminal specifying system, a terminal number estimating device, a terminal specifying device, and a processing method.

BACKGROUND ART

Techniques for specifying wireless terminal devices such as mobile terminal devices have been proposed.

For example, Patent Document 1 describes a method in which a base station such as a femto base station authenticates a mobile station based on the characteristics of a signal received from the mobile station. In this method, the base station performs a discrete Fourier transform on a portion of the signal received from the mobile station that has known contents such as a random access channel preamble. Then, by comparing the characteristics obtained for the reception signal with data in a database, the base station determines whether the mobile station is an acceptable device.

PRIOR ART DOCUMENTS

Patent Document

[Patent Document 1] Published Japanese Translation No. 2011-523832 of the PCT International Publication

SUMMARY OF THE INVENTION

Problem to be Solved by the Invention

The method described in Patent Document 1 is based on the premise that the base station is the communication partner of the mobile station, and that the reception signal from the mobile station can be readily extracted. On the other hand, when a device other than the communication partner of the terminal device (mobile station) specifies the terminal device, the problem is how to extract the signal from the terminal device. In particular, when a plurality of terminal devices are simultaneously transmitting wireless signals, the device that specifies the terminal devices needs to extract the signals of the individual terminal devices from the reception signal.

An example object of the present invention is to provide a terminal number estimating system, a terminal specifying system, a terminal number estimating device, a terminal specifying device, and a processing method capable of solving the above-mentioned problem.

Means for Solving the Problem

According to a first example aspect of the present invention, a terminal number estimating system includes: a plurality of reception means for receiving a wireless signal transmitted from a plurality of terminal devices by frequency-division multiple access; a Fourier transform means for performing a discrete Fourier transform on each wireless signal received by the plurality of reception means and outputting a discrete Fourier coefficient; and a terminal number estimation means for estimating a position of each terminal device by clustering a resource block of each wireless signal based on each discrete Fourier coefficient.

According to a second example aspect of the present invention, a terminal specifying system includes: a plurality of reception means for receiving a wireless signal transmitted from a plurality of terminal devices by frequency-division multiple access; a Fourier transform means for performing a discrete Fourier transform on each wireless signal received by the plurality of reception means and outputting a discrete Fourier coefficient; a means for estimating a position of each terminal device by clustering a resource block of each wireless signal based on each discrete Fourier coefficient, estimating a number of the terminal devices based on the estimated position of each terminal device, and specifying a number or a width of a resource block of each terminal device; a signal separation processing means for separating a wireless signal for each terminal device from each wireless signal on which the discrete Fourier transform is performed, based on the number of the terminal devices and the number or the width of the resource block of each terminal device; and a specifying means for extracting a feature from the wireless signal separated for each terminal device and specifying each terminal device based on the feature of each wireless signal.

According to a third aspect of the present invention, a terminal number estimating device includes: a Fourier transform means for performing a discrete Fourier transform on each wireless signal transmitted from a plurality of terminal devices by frequency-division multiple access and received by a plurality of reception means and outputting a discrete Fourier coefficient; and a terminal number estimation means for estimating a position of each terminal device by clustering a resource block of each wireless signal based on each discrete Fourier coefficient.

According to a fourth example aspect of the present invention, a terminal specifying device includes: a Fourier transform means for performing a discrete Fourier transform on each wireless signal transmitted from a plurality of terminal devices by frequency-division multiple access and received by a plurality of reception means and outputting a discrete Fourier coefficient; a means for estimating a position of each terminal device by clustering a resource block of each wireless signal based on each discrete Fourier coefficient, estimating a number of the terminal devices based on the estimated position of each terminal device, and specifying a number or a width of a resource block of each terminal device; a signal separation processing means for separating a wireless signal for each terminal device from each wireless signal on which the discrete Fourier transform is performed, based on the number of the terminal devices and the number or the width of the resource block of each terminal device; and a specifying means for extracting a feature from the wireless signal separated for each terminal device and specifying each terminal device based on the feature of each wireless signal.

According to a fifth example aspect of the present invention, a processing method includes: receiving, by a plurality of reception means, a wireless signal transmitted from a plurality of terminal devices by frequency-division multiple access; performing a discrete Fourier transform on each wireless signal received by the plurality of reception means and outputting a discrete Fourier coefficient; and estimating a position of each terminal device by clustering a resource block of each wireless signal based on each discrete Fourier coefficient.

Effect of the Invention

According to an example embodiment of the present invention, a device that is not a communication partner of a wireless terminal device can obtain useful information for extracting a signal of an individual wireless terminal device from a reception signal.

BRIEF DESCRIPTION OF THE DRAWINGS

FIG. 6 is a flowchart showing an example of the operation of a radio wave sensor device according to the third example embodiment.

FIG. 7 is a flowchart showing an example of the operation of a specifying processing device according to the third example embodiment.

EXAMPLE EMBODIMENTS

Hereinbelow, example embodiments of the present invention will be described, but the following example embodiments do not limit the inventions claimed. Also, all combinations of features described in the example embodiments may not be essential to the means of solving the invention.

First Example Embodiment

Figure 1:
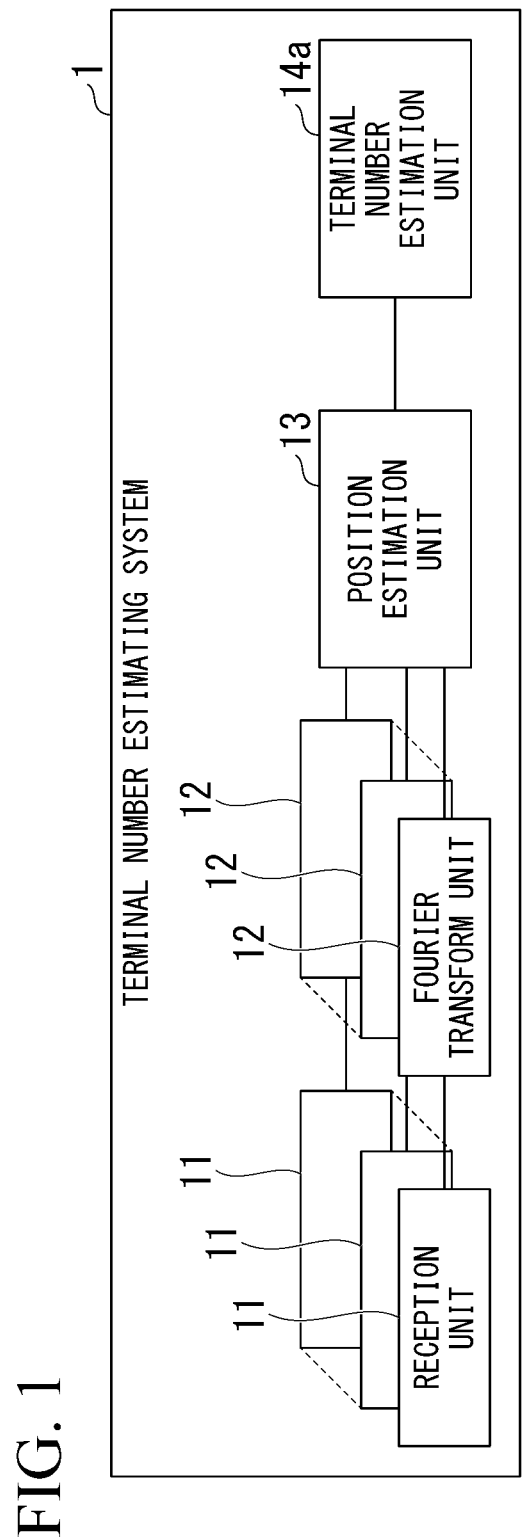
FIG. 1 is a schematic block diagram showing an example of a functional configuration of a terminal number estimating system according to a first example embodiment.

FIG. 1 is a schematic block diagram showing an example of the functional configuration of a terminal number estimating system according to a first example embodiment. With the configuration shown in FIG. 1, the terminal number estimating system 1 includes a reception unit 11, a Fourier transform unit 12, a position estimation unit 13, and a terminal number estimation unit 14a.

The terminal number estimating system 1 receives an uplink wireless signal transmitted by one or more terminal devices (not shown) and estimates the number (individual number) of terminal devices at the transmitting source. Hereinbelow, the uplink wireless signal will be referred to as an uplink signal. The number of terminal devices that are transmitting sources of the uplink signal is referred to as the number of terminal devices. In order to estimate the number of terminal devices, it is desirable to capture the uplink signal transmitted from the terminal device.

The destination of the uplink signal from the terminal device need not be the terminal number estimating system 1.

The uplink signal to be processed by the terminal number estimating system 1 may be an uplink signal of frequency division multiple access (FDMA). The uplink signal to be processed by the terminal number estimating system 1 may be a cellular communication, for example, an LTE (Long Term Evolution; registered trademark) uplink signal (Single Carrier FDMA; SC-FDMA), but is not limited thereto. Since the FDMA uplink signal is transmitted from a plurality of terminal devices at the same time, the signal is multiplexed. Therefore, in order to estimate the number of terminal devices of the transmitting source, it is necessary to separate the signal into the signals of each terminal device.

In the present example embodiment, a case in which the terminal number estimating system 1 receives the uplink signal will be described as an example. However, the signal received by the terminal number estimating system 1 is not limited to an uplink signal. It is sufficient that the signal received by the terminal number estimating system 1 is an FDMA signal in which resources are allocated to one or more terminal devices, with these terminal devices then performing transmission. Further, the destination of the signal received by the terminal number estimating system 1 is not particularly limited to the base station or the access point, and may be communication between the terminal devices.

The above description of the signal and the destination of the signal is the same for other example embodiments.

Figure 2:
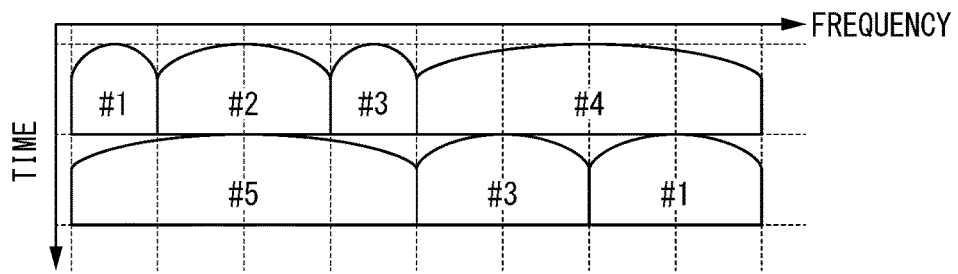
FIG. 2 is a diagram showing an example of allocation of resources to a terminal device in an uplink signal to be processed by the terminal number estimating system according to the first example embodiment.

FIG. 2 is a diagram showing an example of resource allocation to a terminal device in an uplink signal to be processed by the terminal number estimating system 1. In the example of FIG. 2, each of "#1" to "#5" denotes identification information of the terminal devices.

In the example of FIG. 2, the resource of the uplink signal is divided into resource blocks (RB) for each predetermined time (every frame) and for each predetermined number of subcarriers (for example, every 12 consecutive subcarriers), and assigned to the terminal device in units of resource blocks. In the example of FIG. 2, each region separated by a broken line in each of the frequency direction and the time direction corresponds to an example of a resource block.

The allocation of resource blocks to the terminal device is updated every frame.

In the following, a case where one or more resource blocks continuous in the frequency direction are assigned to one terminal device will be described as an example. In this case, the resource block assigned to the terminal device can be specified by specifying the start position of the resource block and the resource block width. The start position of the resource block referred to here is the start position of the resource block having the lowest frequency among the resource blocks assigned to one terminal device. Alternatively, the start position of the resource block having the highest frequency among the resource blocks assigned to one terminal device may be set as the start position of the resource block. The resource block width is the number of resource blocks allocated to one terminal device.

As will be described later, the terminal number estimating system 1 may be configured as a part of the terminal specifying system that specifies the terminal device that is the transmitting source of the uplink signal. When the destination of the uplink signal from the terminal device is other than the terminal specifying system, the frequency and bandwidth transmitted by each terminal device are unknown, so it is necessary to separate (extract) the signal of each terminal device. Therefore, in order to separate (extract) the signal of each terminal device from the uplink signal, the information on the number of terminal devices can be used.

However, the use of the terminal number estimating system 1 is not limited to the use that constitutes a part of the terminal specifying system. For example, the number of terminal devices estimated by the terminal number estimating system 1 may be used for evaluation such as ascertaining the degree of congestion in a wireless environment of a target area.

In FIG. 1, the reception units 11 receive uplink signals. It is sufficient that the number of reception units 11 included in the terminal number estimating system 1 is a plurality. Since the terminal number estimating system 1 includes a plurality of reception units 11, the reception signal strength of each reception unit 11 differs depending on the position of the terminal device of the uplink signal transmitting source, and it is possible to perform clustering (cluster analysis) of the reception signal in accordance with the position of the terminal device that is the transmitting source. Further, when the terminal number estimating system 1 has received a signal by three or more reception units 11, the terminal device that is the transmitting source can be estimated on two-dimensional coordinates, and clustering can be performed with higher accuracy.

The Fourier transform unit 12 performs a discrete Fourier transform (DFT) on the reception signal for each reception unit 11 and outputs a discrete Fourier coefficient.

The position estimation unit 13 estimates the position of each terminal device that has transmitted the uplink signal based on the discrete Fourier coefficient output by the Fourier transform unit 12. For example, the position estimation unit 13 estimates the position of the terminal device that is a transmitting source for each resource block of the uplink signal based on the received radio wave intensity in each reception unit 11. A known position estimation method can be used as a method for the position estimation unit 13 to estimate the position of the terminal device.

The terminal number estimating system 1 is already known for standards such as the subcarrier frequency of the uplink signal and the number of subcarriers of the resource block. On the other hand, the terminal number estimating system 1 does not need to acquire mapping information of the signal of each terminal device to the uplink signal from the base station or the like.

The terminal number estimation unit 14a estimates the number of terminal devices on the basis of the position estimation result of the terminal devices for each resource block. The terminal number estimation unit 14a performs clustering (cluster analysis) that classifies terminal devices whose estimated positions are closer than or equal to a predetermined condition into the same cluster, such as classifying terminal devices whose estimated position difference (distance) is equal to or less than a predetermined threshold value into the same cluster. Then, the terminal number estimation unit 14a estimates the number of clusters obtained as a result of the clustering as the number of terminal devices.

As a method for clustering the estimated positions of terminal devices, the terminal number estimation unit 14a can use a known clustering method such as clustering using a Gaussian Mixture Model (GMM).

Figure 3:
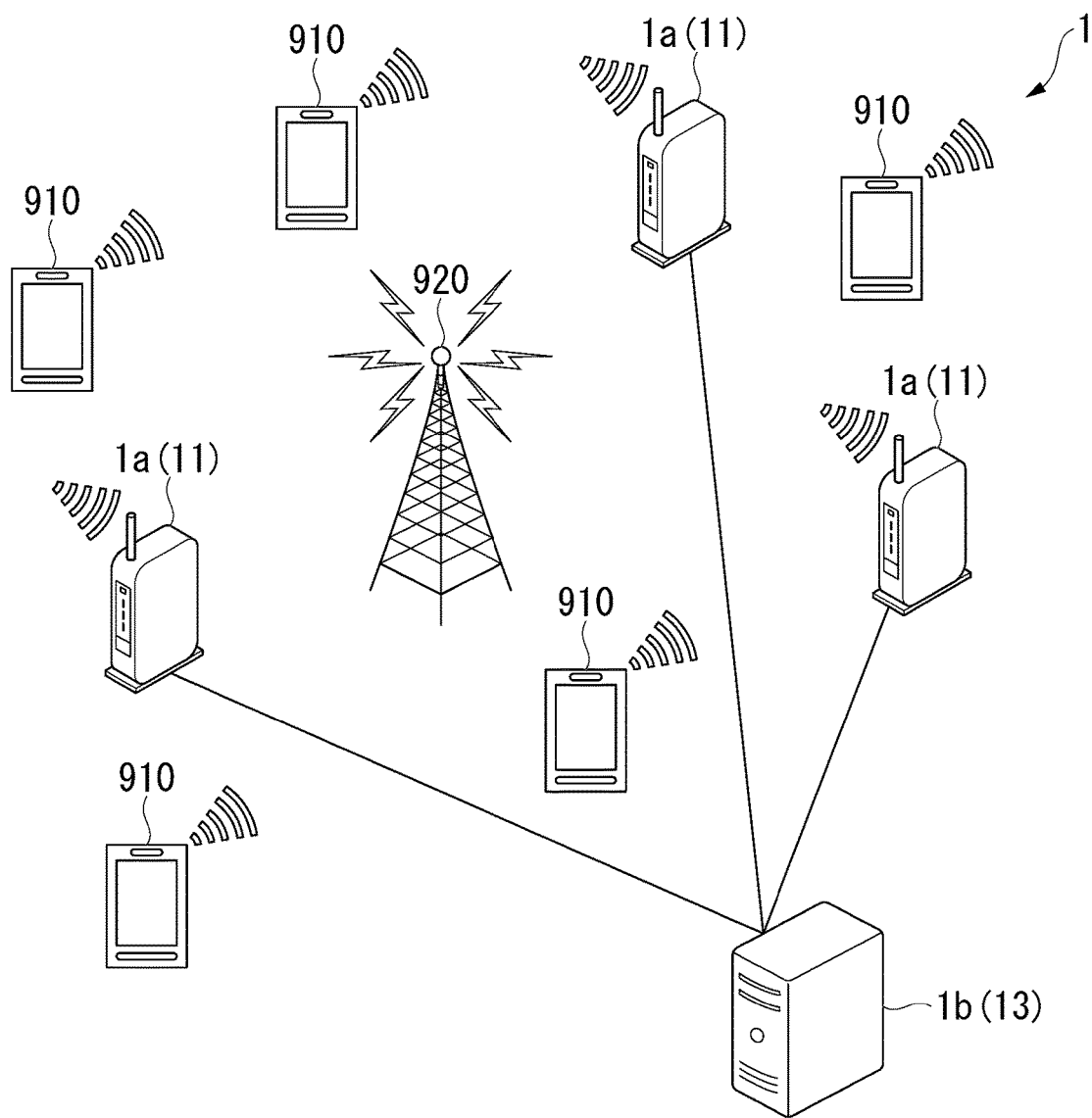
FIG. 3 is a diagram showing an arrangement example of a reception unit according to the first example embodiment.

FIG. 3 is a diagram showing an arrangement example of the reception units 11. In the example of FIG. 3, the terminal number estimating system 1 is composed of a combination of a plurality of sensor devices 1a included in the reception units 11 and a terminal number estimating processing device 1b.

Further, FIG. 3 shows a plurality of terminal devices 910 and a base station device 920. The plurality of terminal devices 910 may simultaneously transmit an uplink signal to the base station device 920. Further, the destination of the wireless signal transmitted by the terminal device 910 does not have to be the terminal number estimating system 1. The terminal device 900 may be a mobile terminal device such as a smartphone or a mobile phone. Further, the terminal device 900 may be an IoT (Internet of Things) terminal, an MTC (Machine Type Communication) terminal, or the like that transmits radio waves. However, the transmission device 900 (the object of individual identification by a transmission device specifying system 10) is not limited to these examples.

As described above, the plurality of reception units 11 receive the uplink signal. The Fourier transform unit 12 discrete-Fourier-transforms the reception signal at each reception unit 11 and outputs a discrete Fourier coefficient. The position estimation unit 13 estimates the position of each terminal device 910 that has transmitted the uplink signal based on the discrete Fourier coefficient output by the Fourier transform unit 12. The terminal number estimation unit 14a estimates the number of terminal devices on the basis of the result of estimating the position of each terminal device 910.

In this way, the terminal number estimating system 1 estimates the position of the terminal devices 910 from the reception signal of the reception unit 11, and estimates the number of terminal devices based on the estimated position of the terminal devices 910. Thereby, the terminal number estimating system 1 can estimate the number of terminal devices without having to acquire allocation information (mapping information determined by the base station) of uplink signal resources to the terminal devices 910.

In particular, the terminal number estimating system 1 can estimate the number of terminal devices even if the destination of the uplink signal from the terminal device 910 is not the terminal number estimating system 1. According to the terminal number estimating system 1, in this respect, even if the terminal number estimating system 1 (or its device) is not a communication partner of the wireless terminal device, it is possible to obtain useful information for extracting the signal of each wireless terminal device from a reception signal.

Second Example Embodiment

A second example embodiment shows an application example of the first example embodiment. Specifically, the second example embodiment shows an example in which the terminal number estimating system according to the first example embodiment is applied to a terminal specifying system.

Figure 4:
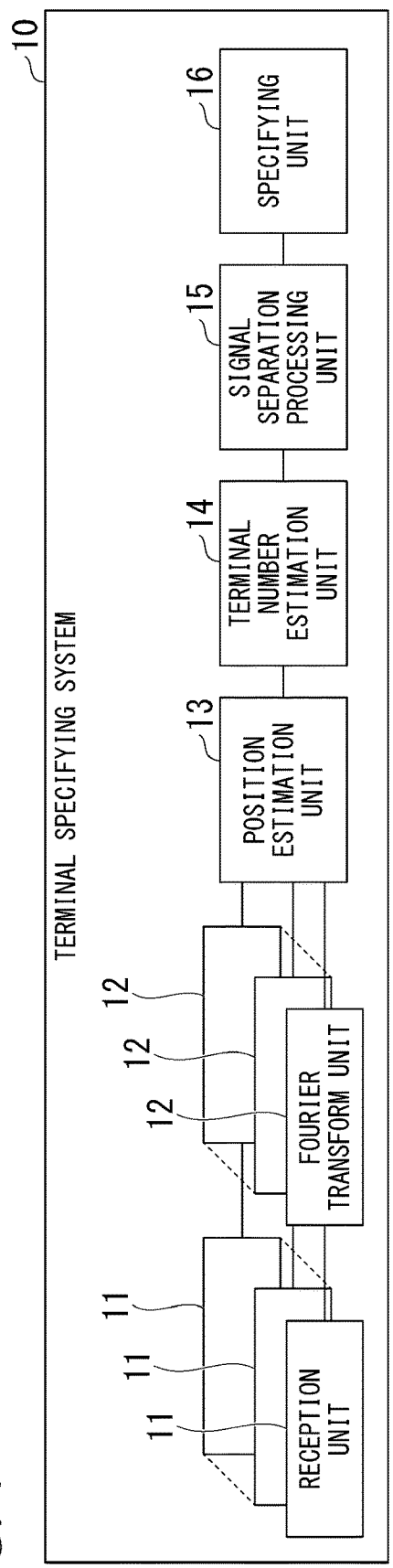
FIG. 4 is a schematic block diagram showing an example of a functional configuration of a terminal specifying system according to a second example embodiment.

FIG. 4 is a schematic block diagram showing an example of the functional configuration of the terminal specifying system according to the second example embodiment. In the configuration shown in FIG. 4, a terminal specifying system 10 includes the reception unit 11, the Fourier transform unit 12, the position estimation unit 13, and a terminal number estimation unit 14.

Of the units of FIG. 4, the units corresponding to the units of FIG. 1 and having the same functions are designated by the same reference symbols (11, 12, 13), and so descriptions thereof will be omitted.

The terminal number estimation unit 14 estimates the number of terminal devices based on the result of estimating the position of the terminal devices 910, similarly to the terminal number estimation unit 14a (FIG. 1).

Further, the terminal number estimation unit 14 estimates the position of the signal of each terminal device 910 in the uplink signal based on the estimation result of the number of terminal devices. Specifically, the terminal number estimation unit 14 clusters each resource block of the uplink signal into a cluster of terminal devices 910 that are the transmitting source of the signal of the resource block. Thereby, for each terminal device 910, the terminal number estimation unit 14 estimates the resource block assigned to that terminal device 910.

The signal separation processing unit 15 separates the signal of each terminal device 910 from the discrete-Fourier-transformed uplink signal based on the result of estimating the position of the signal of each terminal device 910 in the uplink signal. Specifically, the signal separation processing unit 15 takes out each resource block of the uplink signal for each terminal device 910 according to the clustering result of the terminal device 910 that is the transmitting source of the signal of the resource block. Thereby, the signal separation processing unit 15 can take out the signal of each resource block of the uplink signal for each terminal device 910 of the transmitting source.

When subcarriers of a plurality of consecutive resource blocks are assigned to the terminal device by the uplink signal, each units of the terminal specifying system 10 may perform processing in units of the number of carriers assigned to the terminal device, instead of resource block units. For example, when two resource blocks are assigned to each terminal device, each unit of the terminal specifying system 10 may perform processing in units of 24 subcarriers (units of two resource blocks).

A specifying unit 16 specifies the terminal device 910 that is a transmitting source of the separated signal. Specifically, the specifying unit 16 extracts the feature of the reception signal of the reception unit 11 for each terminal device 910 that is a transmitting source of the uplink signal (for each cluster of the terminal devices 910 by the terminal number estimation unit 14). For example, by extracting the feature of the reception signal for each reception unit 11, the specifying unit 16 extracts the feature of the reception signal for each reception unit 11 and each terminal device 910. In addition, "specify" is paraphrased as "identify", "determine" and the like.

As a method used by the specifying unit 16 to specify the terminal device 910 of the transmitting source, a method of evaluating the similarity of the feature, a method of causing the terminal specifying system 10 to perform machine learning using the feature, or the like can be used. For example, the specification unit 16 may use any one or more of correlation degree calculation by cos similarity calculation, k-nearest neighbor method, random forest, support vector machine, and multi-layer perceptron to specify the terminal device 910 of the transmitting source. The specific method is not limited to these examples.

Then, the specifying unit 16 matches (compares) the feature extracted for each terminal device 910 with a feature previously stored in the database for each terminal device 910. Thereby, for each reception unit 11 and for each terminal device 910 that is a transmitting source of the uplink signal, the specifying unit 16 specifies which of the plurality of terminal devices registered in the database the terminal device 910 is. Alternatively, when the specifying unit 16 has determined that the feature of the terminal device 910 is different from any of the features registered in the database, the specifying unit 16 may determine that the terminal device 910 is different from any of the terminal devices registered in the database. The terminal specifying system 10 may include this database, or may access the database of another device.

Moreover, the specifying unit 16 specifies the terminal device 910 that is a transmitting source of the uplink signal on the basis of the specification result for each reception unit 11 and each terminal device 910. Specifically, the specifying unit 16 specifies which of the terminal devices specified for each reception unit 11 the terminal device 910 that is a transmitting source of the uplink signal is. For example, the specifying unit 16 may take a majority vote of the specification results for each reception unit 11.

The feature used by the terminal specifying system 10 to specify the terminal device 910 that is a radio wave transmitting source can be various features in which individual differences of the terminal devices 910 appear. For example, the terminal specifying system 10 may use a feature indicating one or more of the transient (rising and falling) of the reception signal of the reception unit 11, the power spectral density of the preamble portion, the error vector amplitude, the IQ phase (in-phase/orthogonal phase) error, the IQ imbalance amount, the frequency offset, and symbol clock error. The types of features are not limited thereto.

The Fourier transform unit 12 performs a discrete Fourier transform on the reception signal of the reception unit 11.

The feature of the reception signal of the reception unit 11 is used as the feature of the radio wave transmitted by the terminal device 910. Due to the difference in specifications for each terminal device 910 or the variation in the characteristics of analog circuits even for terminal devices 910 with the same specifications, a difference in the radio wave feature (feature of radio waves transmitted by the terminal device 910) arises for each terminal device 910. The terminal specifying system 10 specifies the terminal device that is the transmitting source of the uplink signal by using the difference in the radio wave feature for each terminal device 910.

Here, individual differences in receiver characteristics occur for each reception unit 11 included in the terminal specifying system 10. Even if the reception units 11 included in the terminal specifying system 10 all have the same specifications, individual differences in receiver characteristics occur for each reception unit 11 due to variations in the characteristics of the analog circuit and the like. The feature of the reception signal changes by the individual difference of the receiver characteristic appearing in the reception signal. Even if a plurality of reception units 11 receive the radio waves of the same terminal device 910, the feature of the reception signal differs for each terminal device 910, which may reduce the accuracy with which the terminal specifying system 10 specifies the terminal device 910.

Therefore, the specifying unit 16 may perform a correction for reducing the influence of the receiver characteristic of the reception unit 11 on the feature of the reception signal. For example, the specifying unit 16 may store the feature correction method for each reception unit 11 and correct the feature according to the reception unit 11 that has received the signal.

Alternatively, the terminal specifying system 10 may make a correction to reduce the influence of the receiver characteristic of the reception unit 11 on the reception signal before extracting the feature. For example, the Fourier transform unit 12 may store the correction method according to the receiver characteristic of the corresponding reception unit 11 and correct the reception signal from the reception unit 11.

As described above, the plurality of reception units 11 receive the uplink signal. The Fourier transform unit 12 performs a discrete Fourier transform on the reception signal for each reception unit 11 and outputs a discrete Fourier coefficient. The position estimation unit 13 estimates the position of each terminal device 910 that has transmitted the uplink signal on the basis of the discrete Fourier coefficient output by the Fourier transform unit 12. The terminal number estimation unit 14 estimates the number of terminal devices based on the position estimation result of each terminal device 910, and estimates the position of the signal of each terminal device 910 in the uplink signal based on the result of estimating the number of terminal devices. The signal separation processing unit 15 separates the signal of each terminal device from the discrete-Fourier-transformed uplink signal on the basis of the result of estimating the position of the signal of each terminal device 910 in the uplink signal. The specification unit 16 specifies the terminal device that is a transmitting source of the separated signal.

In this way, the terminal specifying system 10 estimates the number of terminal devices by estimating the position of the terminal device 910 that is a transmitting source of the uplink signal, and separates the signals of the individual terminal devices 910 from the discrete-Fourier-transformed uplink signal. Thereby, the terminal specifying system 10 can identify the terminal device 910 that is a signal transmitting source without having to acquire the allocation information (resource mapping information determined by the base station) of the uplink signal resource to the terminal device 910. In particular, the terminal specifying system 10 can specify the terminal device 910 of the signal transmitting source even if the destination of the uplink signal from the terminal device 910 is not the terminal specifying system 10.

The terminal specifying system 10 can be applied to various uses such as detection and tracking of suspicious persons in urban areas and various facilities, or ascertaining the flow lines of customers in stores.

Further, the terminal specifying system 10 can determine the identity of a transmission device by using the feature of a radio wave, but cannot directly determine the owner of the transmission device from this feature. As described above, the feature of the radio wave used by the terminal specifying system 10 has anonymity, and the terminal specifying system 10 can perform processing with consideration to personal privacy.

Further, the terminal number estimation unit 14 estimates the position of the signal of each terminal device 910 in an uplink signal by clustering each block included in the uplink signal into any cluster for each terminal device 910 based on the result of estimating the position of terminal devices 910 that are transmitting sources of the signal of the block.

As described above, the terminal number estimation unit 14 can estimate the position of the signal of each terminal device 910 in the uplink signal with a relatively simple process of clustering each block included in the uplink signal according to the clustering result of the terminal device 910 that is a transmitting source of the signal of the block.

Third Example Embodiment

A third example embodiment shows a first example that further embodies the second example embodiment.

Figure 5:
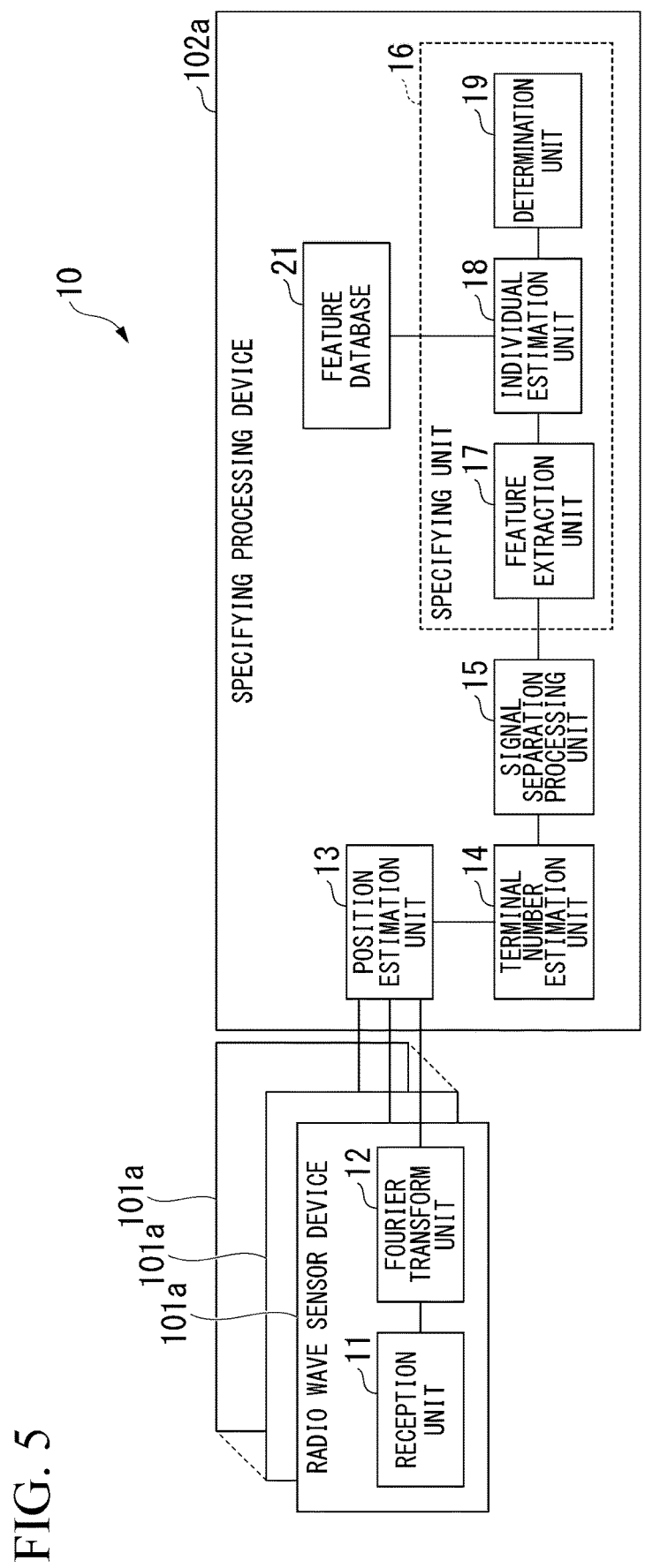
FIG. 5 is a schematic block diagram showing an example of a functional configuration of a terminal specifying system according to a third example embodiment.

FIG. 5 is a schematic block diagram showing an example of the functional configuration of the terminal specifying system 10 according to the third example embodiment. In the configuration shown in FIG. 5, the terminal specifying system 10 includes a plurality of radio wave sensor devices 101a and a specifying processing device 102a. The reception unit 11 and the Fourier transform unit 12 are mounted on each radio wave sensor device 101a. The position estimation unit 13, the terminal number estimation unit 14, the signal separation processing unit 15, the specifying unit 16, and a feature database 21 are mounted on the specifying processing device 102a. The specifying unit 16 includes a feature extraction unit 17, an individual estimation unit 18, and a determination unit 19.

The number of radio wave sensor devices 101a included in the terminal specifying system 10 may be any number as long as it is a plurality. One reception unit 11 is mounted for each one radio wave sensor device 101a. The Fourier transform unit 12 is provided for each reception unit 11.

The feature extraction unit 17 extracts the feature of the reception signal for each reception unit and for each cluster in which the terminal number estimation unit 14 clusters the terminal devices 910 that are signal transmitting sources. For example, the feature extraction unit 17 extracts the feature of the reception signal for each reception unit 11 and for each resource block, and by calculating the average value of the feature for the resource blocks classified as signals of the same terminal device 910, extracts the feature of the reception signal for each reception unit 11 and for each cluster of the terminal devices 910.

The individual estimation unit 18 estimates, based on the feature, the terminal device of the radio wave transmitting source for each reception unit 11 and for each cluster in which the terminal number estimation unit 14 clusters the terminal devices 910 of the signal transmitting source. Specifically, the individual estimation unit 18 matches the feature of the reception signal extracted by the feature extraction unit 17 for each reception unit 11 and for each cluster in which the terminal number estimation unit 14 clusters the terminal devices 910 of the signal transmitting source, and the feature for each terminal device registered in the feature database 21 in advance. Thereby, for each reception unit 11 and for each terminal device 910 that is a transmitting source of the uplink signal, the individual estimation unit 18 specifies which of the terminal devices registered in the feature database 21 that terminal device 910 is. Alternatively, the individual estimation unit 18, upon having determined that the feature of the terminal device 910 is different from any of the features registered in the feature database 21, may determine that the feature of the terminal device 910 differs from any of the terminal devices registered in the feature database 21.

For each cluster in which the terminal number estimation unit 14 clusters the terminal devices 910 of the signal transmitting source, the determination unit 19 determines which of the terminal devices 910 estimated by the individual estimation unit 18 for each reception unit 11 the terminal device 910 that is a radio wave transmitting source is. For example, the determination unit 19 may make a majority vote of the specification results of the terminal devices 910 for each reception unit 11 by the individual estimation unit 18.

For each terminal device, the feature database 21 stores the feature of the transmission signal of that terminal device. As described above, the feature database 21 is used for the individual estimation unit 18 to specify the terminal device 910.

FIG. 5 shows an example in which the specifying processing device 102a includes the feature database 21. However, another device may include the feature database 21, and the individual estimation unit 18 may access the feature database 21 of that device.

FIG. 6 is a flowchart showing an example of the operation of the radio wave sensor device 101a. Upon receiving the uplink signal, the radio wave sensor device 101a performs the process shown in FIG. 6. For example, the radio wave sensor device 101a performs the processing of FIG. 6 for each frame of the uplink signal.

In the process of FIG. 6, the reception unit 11 performs wireless reception processing such as synchronous processing on the received signal, analog-to-digital conversion, extraction of a portion corresponding to the feature handled by the terminal specifying system 10 (for example, removal of cyclic prefix), and the like (Step S111).

Next, the Fourier transform unit 12 performs a discrete Fourier transform on the reception signal that the reception unit 11 has performed the wireless reception processing, and outputs a Fourier coefficient (Step S112). Then, the radio wave sensor device 101a transmits the obtained frame coefficient to the specifying processing device 102a (Step S113).

After Step S113, the radio wave sensor device 101a ends the process of FIG. 6.

FIG. 7 is a flowchart showing an example of the operation of the specifying processing device 102a.

In the process of FIG. 7, the specifying processing device 102a receives the Fourier coefficient from each of the plurality of radio wave sensor devices 101 (Step S121). Then, for each terminal device 910 that is a signal transmitting source, the specifying processing device 102a performs a process of separating the signal from the Fourier-transformed reception signal indicated by the Fourier coefficient (Step S122). Then, for each terminal device 910 of the signal transmitting source, the specifying processing device 102a performs a process of identifying the terminal device (Step S123).

After Step S123, the specifying processing device 102 ends the process of FIG. 7.

Figure 8:
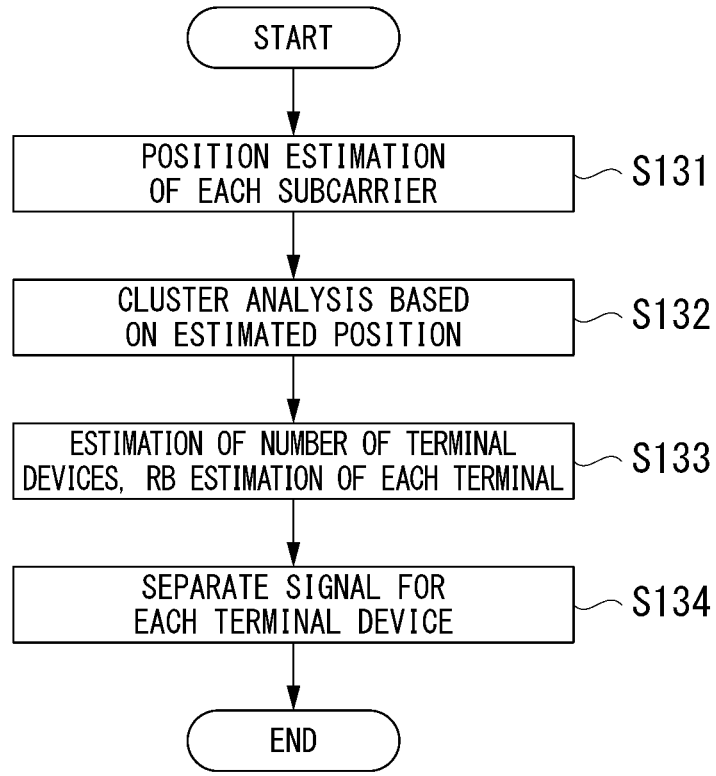
FIG. 8 is a flowchart showing an example of a processing procedure in which the specifying processing device according to the third example embodiment separates a signal from a Fourier-transformed reception signal for each terminal device of a signal transmitting source.

FIG. 8 is a flowchart showing an example of a processing procedure in which the specifying processing device 102a separates a signal from the Fourier-transformed reception signal for each terminal device 910 that is a signal transmitting source. The specifying processing device 102a performs the processing of FIG. 8 in Step S122 of FIG. 7.

In the process of FIG. 8, the position estimation unit 13 estimates the position of the terminal device 910 that is a transmitting source for each resource block of the uplink signal (Step S131).

Next, the terminal number estimation unit 14 performs cluster analysis based on the estimated position of the terminal device 910 that is a transmitting source estimated by the position estimation unit 13 for each resource block (Step S132). Specifically, the terminal number estimation unit 14 performs clustering that classifies terminal devices 910 whose positions estimated by the position estimation unit 13 are closer than or equal to a predetermined condition into the same cluster with respect to the terminal device 910 that is a transmitting source of the signal of each resource block.

When the terminal devices 910 classified into the same cluster are interpreted as the same terminal device 910, one cluster indicates one terminal device 910. This terminal device 910 is referred to as the terminal device 910 of this cluster.

Then, the terminal number estimation unit 14 determines the number of terminal devices of the uplink transmitting source based on the cluster analysis result, and determines the resource block assigned to each terminal device 910 (Step S133). Specifically, the terminal number estimation unit 14 determines that the number of clusters obtained in the process of Step S132 is the number of terminal devices. Then, for each cluster obtained in the process of Step S132, the terminal number estimation unit 14 determines the resource block in which the terminal device 910 of that cluster is the radio wave transmitting source to be the resource block assigned to the terminal device 910 of that cluster.

For each cluster obtained in the process of Step S132, the signal separation processing unit 15 separates (extracts) the transmission signal of the terminal device 910 of that cluster from the uplink signal (Step S134). Specifically, the signal separation processing unit 15 classifies each resource block of the uplink signal according to the clustering of the terminal device 910 that is a transmitting source of the signal of the resource block. Thereby, the signal separation processing unit 15 can classify the signal for each resource block of the uplink signal by each terminal device 910 of the transmitting source.

After Step S134, the specifying processing device 102a ends the process of FIG. 8.

Figure 9:
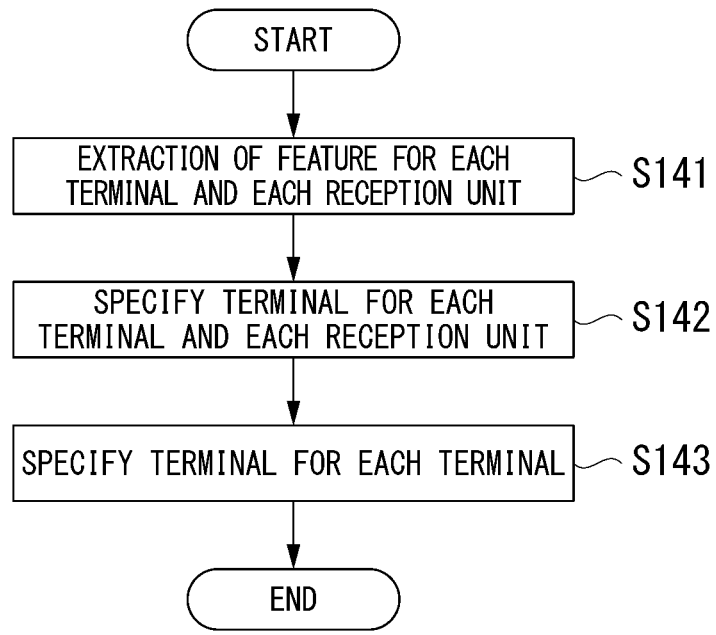
FIG. 9 is a flowchart showing an example of a procedure in which the specifying processing device according to the third example embodiment performs a process of identifying a terminal device for each terminal device that is a signal transmitting source.

FIG. 9 is a flowchart showing an example of a procedure in which, for each terminal device 910 of the signal transmitting source, the specifying processing device 102a performs a process of identifying the terminal device. The terminal device 910 performs the process of FIG. 9 in Step S123 of FIG. 7.

In the process of FIG. 9, the feature extraction unit 17 extracts the feature of the reception signal for each terminal device 910 and for each reception unit 11 (Step S141). For example, the feature extraction unit 17 extracts the feature of the reception signal for each reception unit 11. Thereby, the feature extraction unit 17 extracts the feature of the reception signal for each reception unit 11 and for each cluster of the terminal device 910.

Next, the individual estimation unit 18 specifies the terminal device for each terminal device 910 and for each reception unit 11 (Step S142). Specifically, the individual estimation unit 18 matches the feature of the reception signal extracted by the feature extraction unit 17 for each reception unit 11 and for each cluster in which the terminal number estimation unit 14 clusters the terminal devices 910 of the signal transmitting source, and the feature for each terminal device registered in the feature database 21 in advance. Thereby, for each reception unit 11 and for each terminal device 910 that is a transmitting source of the uplink signal, the individual estimation unit 18 specifies which of the terminal devices registered in the feature database 21 that terminal device 910 is. Alternatively, when the individual estimation unit 18 has determined that the feature of the terminal device 910 is different from any of the features registered in the feature database 21, the individual estimation unit 18 may determine that the feature of that terminal device 910 differs from any of the terminal devices registered in in the feature database 21.

Next, for each cluster of the terminal device 910, the determination unit 19 specifies the terminal device 910 of that cluster (Step S143). Specifically, for each cluster in which the terminal number estimation unit 14 has clustered the terminal devices 910 of the signal transmitting source, the determination unit 19 determines which of the terminal devices 910 estimated by the individual estimation unit 18 for each reception unit 11 the terminal device 910 that is a radio wave transmitting source is. For example, the determination unit 19 may make a majority vote of the specification result of the terminal device 910 for each reception unit 11 by the individual estimation unit 18.

After Step S143, the specifying processing device 102a ends the process of FIG. 9.

Figure 10:
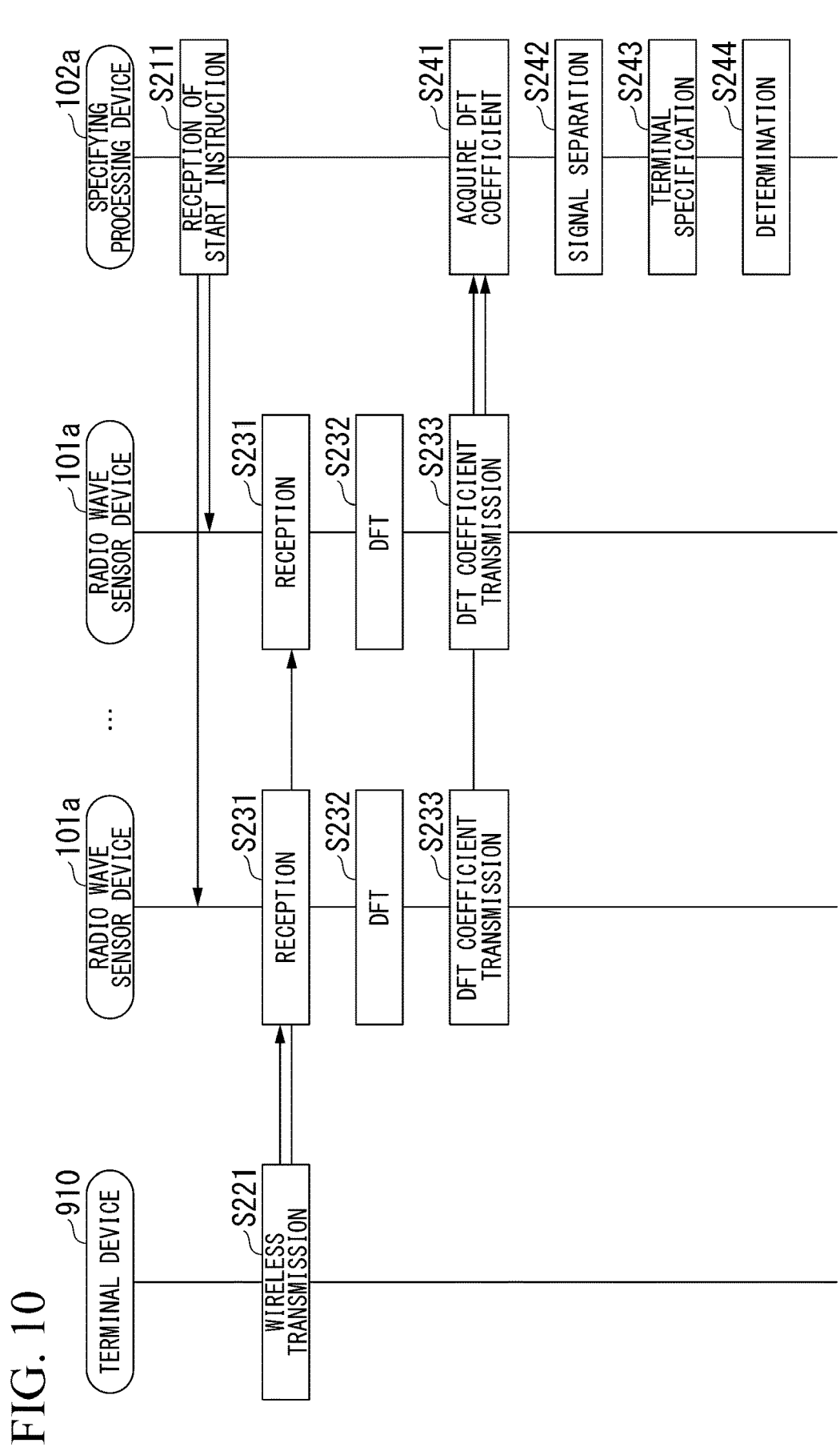
FIG. 10 is a sequence diagram showing an operation example of the terminal specifying system according to the third example embodiment.

FIG. 10 is a sequence diagram showing an operation example of the terminal specifying system 10 according to the third example embodiment.

In the process of FIG. 10, the specifying processing device 102a instructs each of the radio wave sensor devices 101a to start receiving a signal (sequence S211).

Afterward, when the terminal device 910 transmits an uplink signal (sequence S221), the reception unit 11 of the radio wave sensor device 101a receives the signal transmitted by the terminal device 910 (sequence S231). The reception unit 11 that has received the signal transmitted by the terminal device 910 performs the wireless reception process described in Step S111 of FIG. 6 on the received signal.

In the radio wave sensor device 101a that has received the signal from the terminal device 910, the reception unit 11 performs a discrete Fourier transform on the reception signal that has undergone wireless reception processing (sequence S232). Then, the radio wave sensor device 101a that has received the signal from the terminal device 910 transmits the Fourier coefficient obtained by the discrete Fourier transform to the specifying processing device 102a (sequence S233).

When the specifying processing device 102a acquires the DFT coefficient transmitted by the radio wave sensor device 101a (sequence S241), the signal separation processing unit 15 of the specifying processing device 102 separates the signals of individual terminal devices 91 from the discrete-Fourier-transformed uplink signal (sequence S242). Specifically, the signal separation processing unit 15 classifies each resource block of the uplink signal according to the clustering of the terminal device 910 that is a transmitting source of the signal of the resource block. Thereby, the signal separation processing unit 15 can classify the signal for each resource block of the uplink signal by each terminal device 910 of the transmitting source.

Next, the individual estimation unit 18 estimates the terminal device of the radio wave transmitting source for each reception unit 11 and for each cluster in which the terminal number estimation unit 14 clusters the terminal devices 910 of the signal transmitting source (sequence S243). Specifically, the individual estimation unit 18 matches the feature of the reception signal extracted by the feature extraction unit 17 for each reception unit 11 and for each cluster in which the terminal number estimation unit 14 clusters the terminal devices 910 of the signal transmitting source, and the feature for each terminal device registered in the feature database 21 in advance. Thereby, for each reception unit 11 and for each terminal device 910 that is a transmitting source of the uplink signal, the individual estimation unit 18 specifies which of the terminal devices registered in the feature database 21 that terminal device 910 is. Alternatively, when the individual estimation unit 18 has determined that the feature of the terminal device 910 is different from any of the features registered in the feature database 21, the individual estimation unit 18 may determine that the feature of that terminal device 910 differs from any of the terminal devices registered in the feature database 21.

Next, for each cluster in which the terminal number estimation unit 14 clusters the terminal devices 910 of the signal transmitting source, the determination unit 19 determines which of the terminal devices 910 estimated by the individual estimation unit 18 for each reception unit 11 the terminal device 910 that is a radio wave transmitting source is (sequence S244). For example, the determination unit 19 may make a majority vote of the specification result of the terminal device 910 for each reception unit 11 by the individual estimation unit 18.

After sequence S244, the terminal specifying system 10 ends the process of FIG. 10.

As described above, the radio wave sensor device 101a includes the reception unit 11 and the Fourier transform unit 12. The specifying processing device 102a includes the position estimation unit 13, the terminal number estimation unit 14, the signal separation processing unit 15, and the specifying unit 16.

As a result, in the terminal specifying system 10, the configuration of the radio wave sensor device 101a can be made relatively simple, and the manufacturing cost of the radio wave sensor device 101a can be made relatively low.

Fourth Example Embodiment

A fourth example embodiment shows a second example that further embodies the second example embodiment.

Figure 11:
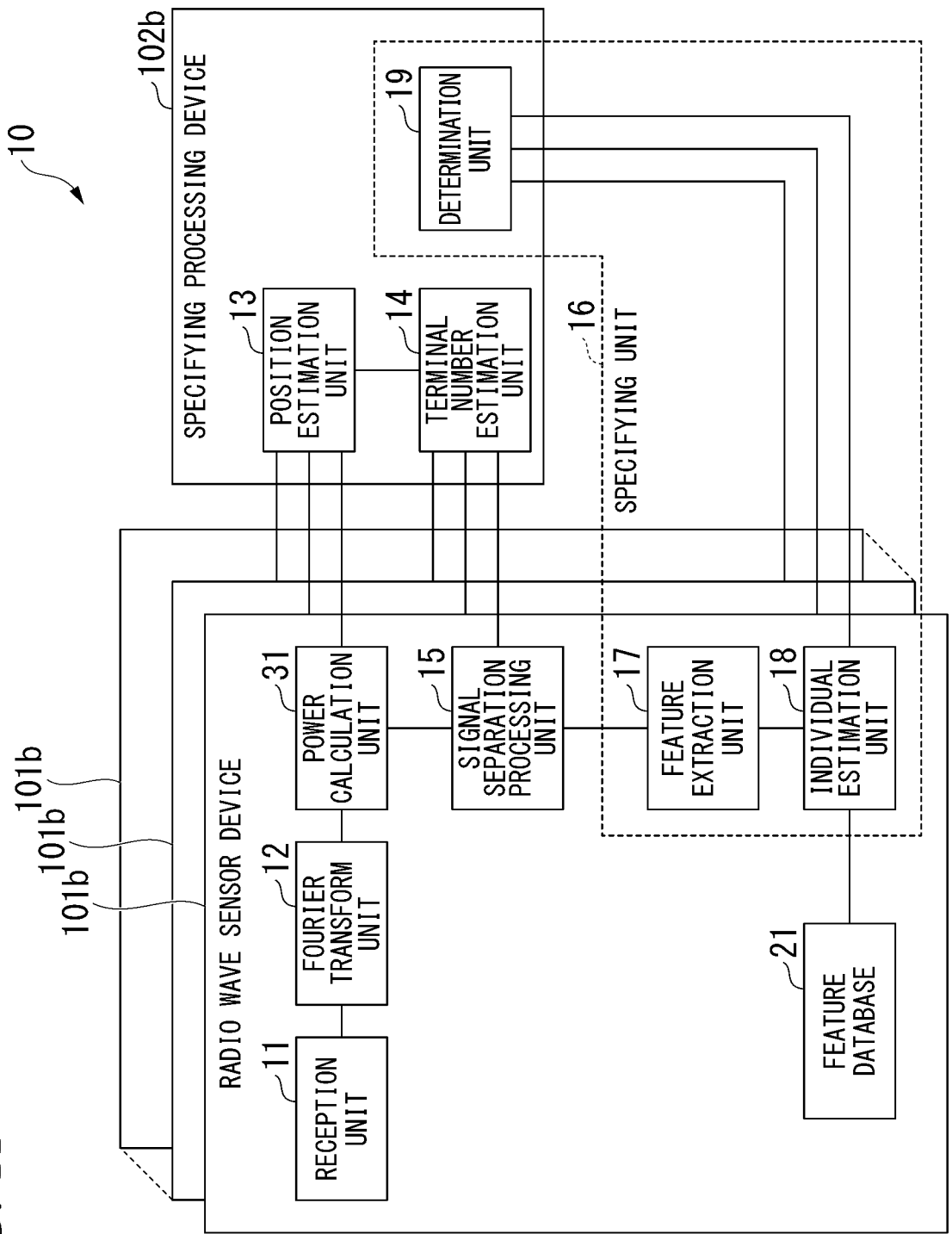
FIG. 11 is a schematic block diagram showing an example of a functional configuration of a terminal specifying system according to a fourth example embodiment.

FIG. 11 is a schematic block diagram showing an example of the functional configuration of the terminal specifying system 10 according to the fourth example embodiment. In the configuration shown in FIG. 11, the terminal specifying system 10 includes a plurality of radio wave sensor devices 101b and a specifying processing device 102b. The reception unit 11, the Fourier transform unit 12, the signal separation processing unit 15, the feature extraction unit 17, the individual estimation unit 18, and the feature database 21 are mounted on each radio wave sensor device. The position estimation unit 13, the terminal number estimation unit 14, and the determination unit 19 are mounted on the specifying processing device 102b.

The combination of the feature extraction unit 17, the individual estimation unit 18, and the determination unit 19 corresponds to the example of the specifying unit 16.

The number of radio wave sensor devices 101b included in the terminal specifying system 10 may be any number as long as it is a plurality. One reception unit 11 is mounted for one radio wave sensor device 101b. The Fourier transform unit 12 is provided for each reception unit 11.

Of the units of FIG. 11, those parts corresponding to the units of FIG. 5 and having the same functions are designated by the same reference symbols (11 to 19, 21), and so descriptions thereof are omitted.

A power calculation unit 31 calculates the reception power of the radio wave sensor device 101b for each resource block included in the uplink signal based on the discrete Fourier coefficient output by the Fourier transform unit 12.

Here, the IQ signal obtained from the discrete Fourier coefficient output by the Fourier transform unit 12 indicates the power (amplitude) and phase of the reception signal. In order for the position estimation unit 13 to estimate the position of the terminal device 910, it is sufficient to know the reception signal power amount, with the phase information being unnecessary. Therefore, the power calculation unit 31 calculates the distance from the origin of the IQ signal (the route of $(I^2+Q^2)$) and uses it as information indicating the reception power.

Figure 12:
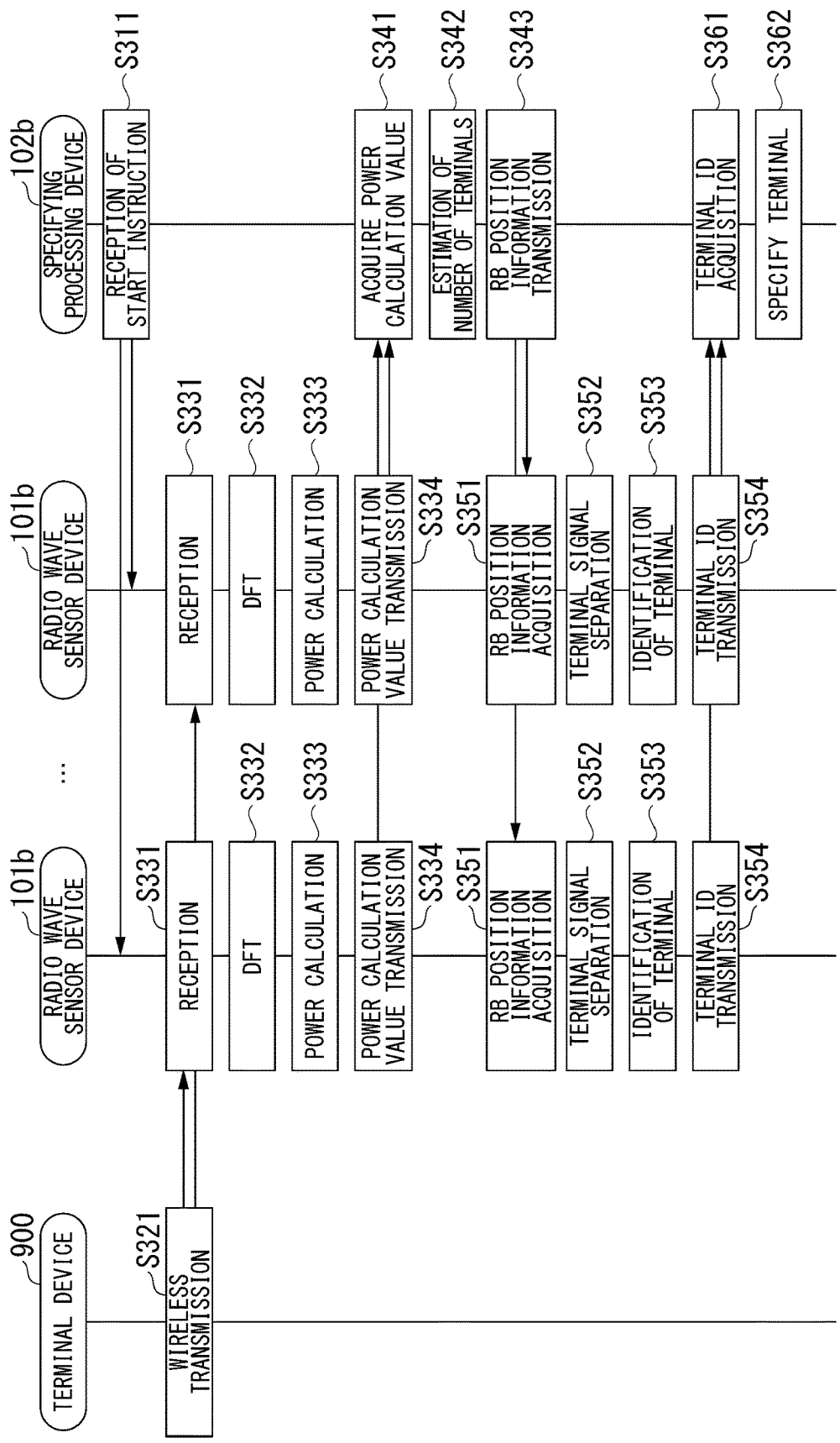
FIG. 12 is a sequence diagram showing an operation example of the terminal specifying system according to the fourth example embodiment.

FIG. 12 is a sequence diagram showing an operation example of the terminal specifying system 10 according to the fourth example embodiment.

The sequences S311 to S332 in FIG. 12 are the same as the sequences S211 to S232 in FIG. 10.

After sequence S332, the power calculation unit 31 calculates the magnitude of the reception power of the reception unit 11 for each resource block of the uplink signal (sequence S333). For example, the power calculation unit 31 calculates the distance from the origin of the IQ signal as information indicating the reception power as described above.

Then, the radio wave sensor device 101b transmits the power calculation value (information indicating the magnitude of the received power) calculated by the power calculation unit 31 to the specifying processing device 102b (sequence S334).

Regarding the specifying processing device 102b, when the power calculation value transmitted by the radio wave sensor device 101b is acquired (sequence S341), the terminal number estimation unit 14 estimates the number of terminal devices that are transmitting sources of the uplink signal (sequence S342).

Then, the terminal number estimation unit 14 estimates the position of the allocated resource block for each number of terminal devices that are transmitting sources of the uplink signal.

The specifying processing device 102b transmits information indicating the estimated position of the resource block to the radio wave sensor device 101b (sequence S343).

Regarding the radio wave sensor device 101b, when the position information of the resource block transmitted by the specifying processing device 102b is acquired (sequence S351), the signal separation processing unit 15 separates the signal for each terminal device 910 from the uplink signal (sequence S352).

Then, the individual estimation unit 18 identifies the terminal device 910 that is a transmitting source of the uplink signal (sequence S353). Specifically, the individual estimation unit 18 extracts the feature of the signal for each terminal device 910 separated by the signal separation processing unit 15, and by performing matching with the feature registered in the feature database 21, determines which of the terminal devices registered in the feature database 21 the terminal device 910 that is a transmitting source of the uplink signal is.

The radio wave sensor device 101b transmits the identification information (terminal ID) of the terminal device identified by the individual estimation unit 18 to the specifying processing device 102b for each terminal device 910 that is a transmitting source of the uplink signal (sequence S354).

Regarding the specifying processing device 102b, when the terminal ID (identification result of the individual estimation unit 18) from the radio wave sensor device 101b (sequence S361) is acquired, the determination unit 19 performs specification of the terminal device 910 that is a transmitting source of the uplink signal (sequence S362). Specifically, the terminal ID from the radio wave sensor device 101b indicates the terminal device of the identification result for each terminal device 910 and for each reception unit 11. The determination unit 19 determines which of the terminal devices of the identification result for each terminal device 910 and each reception unit 11 the terminal device 910 that is the transmitting source of the uplink signal is. For example, the determination unit 19 may take a majority vote of the identification results for each terminal device 910 and for each reception unit 11.

After sequence S362, the terminal identification system 10 ends the process of FIG. 12.

As described above, the power calculation unit 31 calculates the reception power of the radio wave sensor device 101b for each resource block included in the uplink signal based on the discrete Fourier coefficient obtained by the Fourier transform unit 12 performing a discrete Fourier transform on the reception signal. The position estimation unit 13 estimates the position of the terminal device 910 that is a radio wave transmitting source for each resource block based on the reception power calculated by the power calculation unit 31.

Thereby, it is sufficient that the power calculation unit 31 notifies the position estimation unit 13 of the reception power for each resource block. In this respect, according to the terminal identification system 10, the amount of data to be notified to the position estimation unit 13 can be reduced as compared with the case where the discrete Fourier coefficient calculated by the Fourier transform unit 12 is notified to the position estimation unit 13 as is. In particular, when the power calculation unit 31 is mounted on the radio wave sensor device 101b and the position estimation unit 13 is mounted on the specifying processing device 102b, the amount of communication between the radio wave sensor device 101b and the specifying processing device 102b can be relatively small.

Further, the feature extraction unit 17 extracts the feature of the reception signal for each reception unit 11 and for each cluster in which the terminal number estimation unit 14 clusters the terminal devices 910 of the signal transmitting source. The individual estimation unit 18 estimates the terminal device 910 of the signal transmitting source for each reception unit 11 and for each cluster in which the terminal number estimation unit 14 clusters the terminal devices 910 of the signal transmitting source on the basis of the feature extracted by the feature extraction unit 17. The determination unit 19 determines, for each cluster in which the terminal number estimation unit 14 clusters the terminal devices 910 of the signal transmitting source, which of the terminal devices 910 estimated by the individual estimation unit 18 for each reception unit 11 the terminal device 910 of the radio wave transmitting source is. The radio wave sensor device 101b includes the reception unit 11, the Fourier transform unit 12, the power calculation unit 31, the signal separation processing unit 15, the feature extraction unit 17, and the individual estimation unit 18. The specifying processing device 102b includes the position estimation unit 13, the terminal number estimation unit 14, and the determination unit 19.

Thereby, according to the terminal specifying system 10, only the reception power for each resource block and the terminal ID of the identification result need be transmitted from the radio wave sensor device 101b to the specifying processing device 102b, and only the position information of the resource block for each terminal device 910 need be transmitted from the specifying processing device 102b to the radio wave sensor device 101b. According to the terminal specifying system 10, the amount of communication between the radio wave sensor device 101b and the specifying processing device 102b can be relatively small in this respect.

Fifth Example Embodiment

A fifth example embodiment shows a third example in which the second example embodiment is further embodied.

Figure 13:
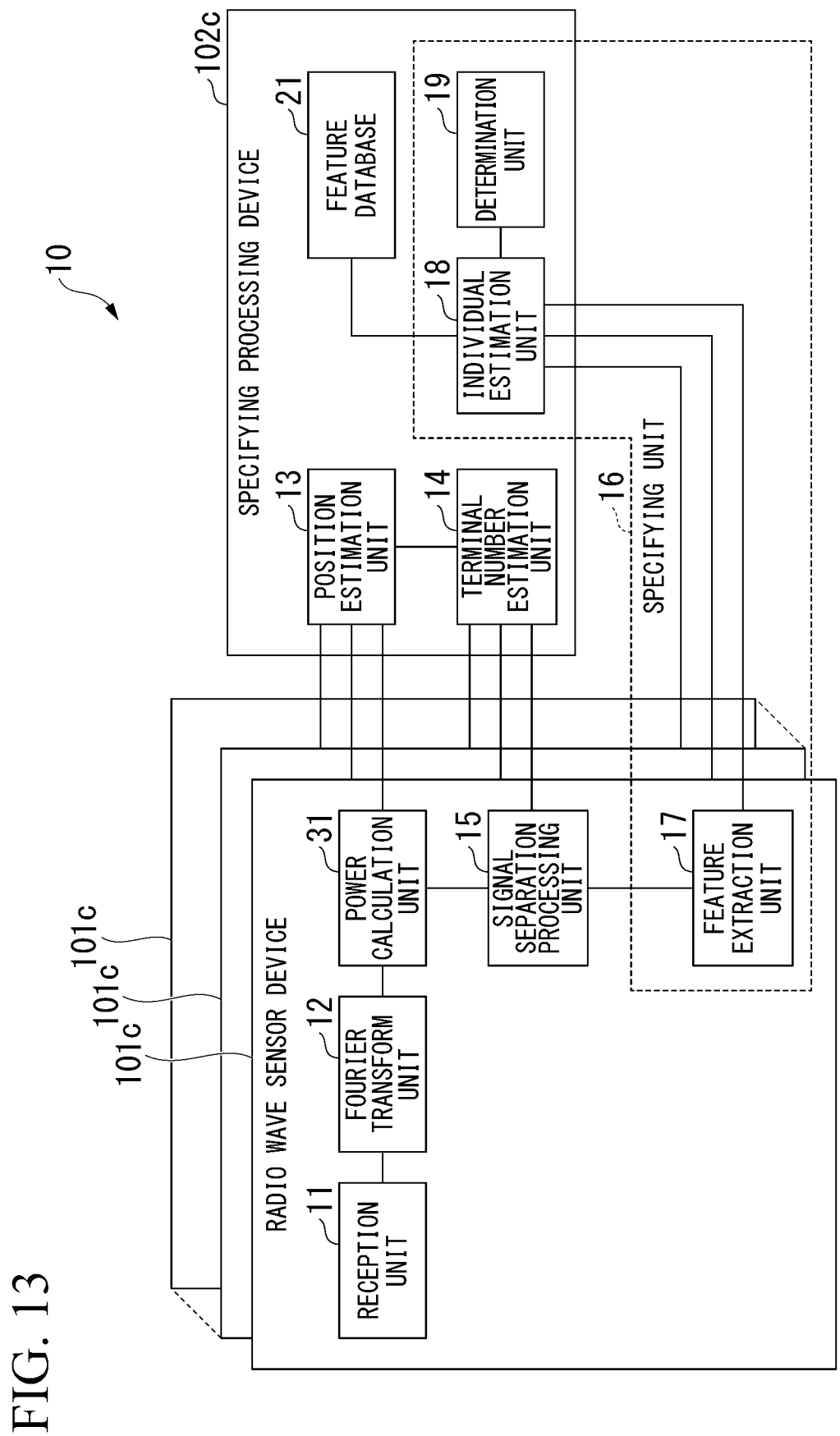
FIG. 13 is a schematic block diagram showing an example of a functional configuration of a terminal specifying system according to a fifth example embodiment.

FIG. 13 is a schematic block diagram showing an example of the functional configuration of the terminal identification system 10 according to the fifth example embodiment. In the configuration shown in FIG. 13, the terminal identification system 10 includes a radio wave sensor device 101c and a specifying processing device 102c. The reception unit 11, the Fourier transform unit 12, the signal separation processing unit 15, the feature extraction unit 17, and the power calculation unit 31 are mounted on the radio wave sensor device 101c. The position estimation unit 13, the terminal number estimation unit 14, the individual estimation unit 18, the determination unit 19, and the feature database 21 are mounted on the specifying processing device 102c.

It is sufficient that the number of radio wave sensor devices 101c included in the terminal specifying system 10 is a plurality. One reception unit 11 is mounted on one radio wave sensor device 101c. The Fourier transform unit 12 is provided for each reception unit 11.

Of the units of FIG. 13, the units corresponding to the units of FIG. 11 and having the same functions are designated by the same reference symbols (11 to 19, 21, 31) and so the descriptions thereof will be omitted.

Comparing the terminal specifying system 10 according to the fifth example embodiment with the terminal specifying system 10 according to the fourth example embodiment, in the point of the individual estimation unit 18 and the feature database 21 being mounted on the specifying processing device side, the fifth example embodiment is different from the case of the fourth example embodiment in which these are mounted on the radio wave sensor device side. Other than that, the terminal specifying system 10 according to the fifth example embodiment is the same as that of the fourth example embodiment.

Figure 14:
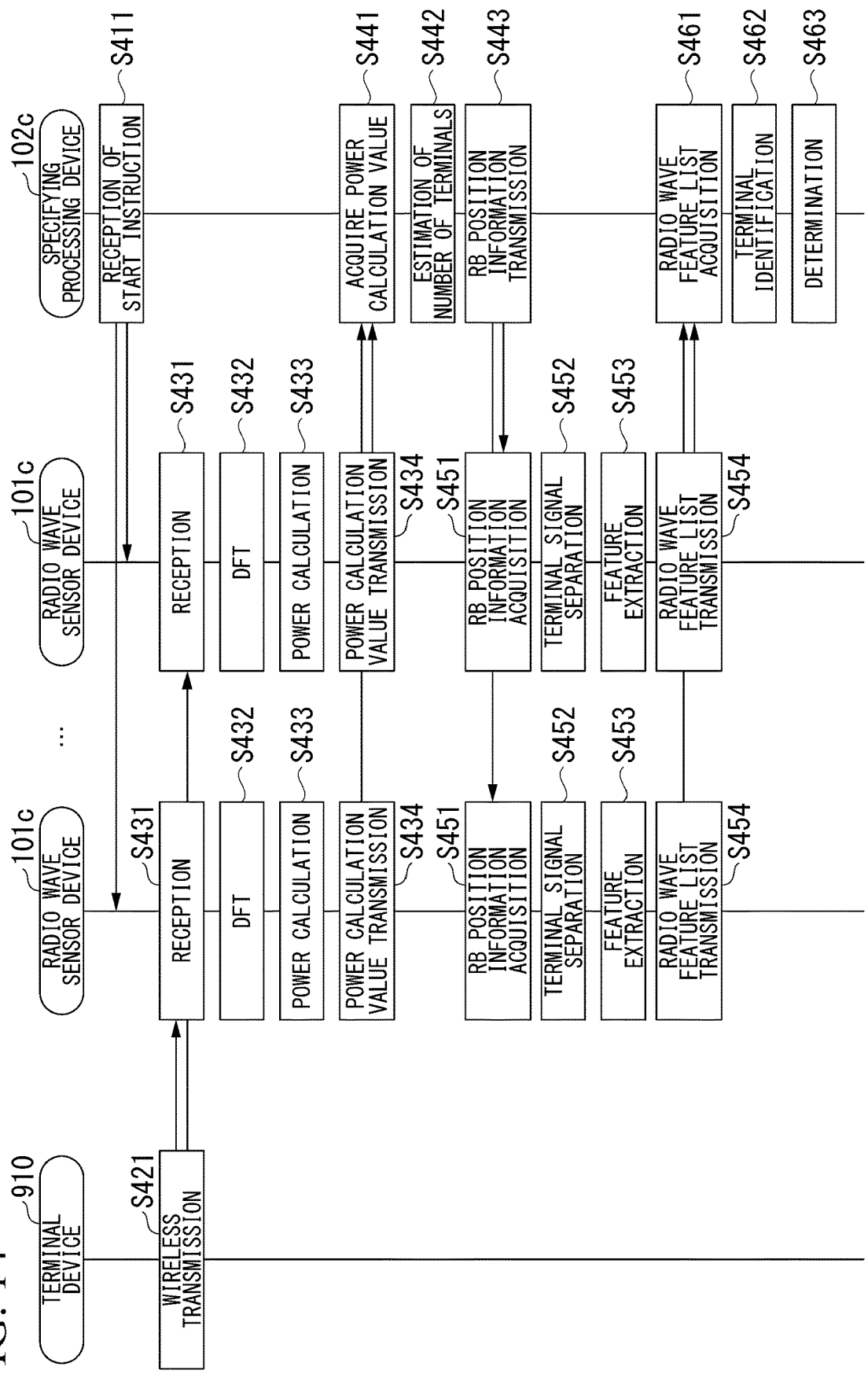
FIG. 14 is a sequence diagram showing an operation example of the terminal specifying system according to the fifth example embodiment.

FIG. 14 is a sequence diagram showing an operation example of the terminal specifying system 10 according to the fifth example embodiment.

The sequences S411 to S452 in FIG. 14 are the same as the sequences S311 to S352 in FIG. 12.

After sequence S452, the feature extraction unit 17 extracts the feature of the reception signal of the reception unit 11 for each signal separated by the signal separation processing unit 15 (thus, for each terminal device 910 that is a transmitting source of the uplink signal) (sequence S453).

Then, the radio wave sensor device 101c transmits a radio wave feature list indicating the features extracted by the feature extraction unit 17 to the specifying processing device 102c (sequence S454).

Regarding the specifying processing device 102c, when the radio wave feature list from the radio wave sensor device 101c is acquired (sequence S461), the individual estimation unit 18, for each reception unit 11 and for each terminal device 910 that is a transmitting source of the uplink signal, identifies the terminal device 910, based on the feature indicated by the radio wave feature list (sequence S462).

Then, the determination unit 19 specifies the terminal device 910 that is a transmitting source of the uplink signal (sequence S463). Specifically, the determination unit 19 determines which of the terminal devices of the identification result by the individual estimation unit 18 for each terminal device 910 and for each reception unit 11 the terminal device 910 that is a transmitting source of the uplink signal is. For example, the determination unit 19 may take a majority vote of the identification results for each terminal device 910 and for each reception unit 11.

After sequence S463, the terminal specifying system 10 ends the process of FIG. 14.

As described above, the feature extraction unit 17 extracts the feature of the reception signal for each reception unit 11 and for each cluster in which the terminal number estimation unit 14 clusters the terminal devices 910 of the signal transmitting source. The individual estimation unit 18 estimates the terminal device 910 that is a signal transmitting source for each reception unit 11 and for each cluster in which the terminal number estimation unit 14 clusters the terminal devices 910 of the signal transmitting source, based on the feature extracted by the feature extraction unit 17. The determination unit 19 determines, for each cluster in which the terminal number estimation unit 14 clusters the terminal devices 910 of the signal transmitting source, which of the terminal devices 910 estimated by the individual estimation unit 18 for each reception unit 11 the terminal device 910 of the transmitting source is. Further, the radio wave sensor device 101c includes the reception unit 11, the Fourier transform unit 12, the power calculation unit 31, the signal separation processing unit 15, and the feature extraction unit 17. The specifying processing device 102b includes the position estimation unit 13, the terminal number estimation unit 14, the individual estimation unit 18 and the determination unit 19.

Thereby, accordingly to the terminal specifying system 10, it is sufficient that the reception power for each resource block and the feature list indicating the feature extracted by the feature extraction unit 17 are transmitted from the radio wave sensor device 101c to the specifying processing device 102c, and the position information of the resource block for each terminal device 910 is transmitted from the specifying processing device 102c to the radio wave sensor device 101c. According to the terminal specifying system 10, the amount of communication between the radio wave sensor device 101c and the specifying processing device 102c can be relatively small in this respect.

Further, each of the radio wave sensor devices 101c does not need to include the feature database 21, and in this respect, the feature database 21 is relatively easy to manage.

Sixth Example Embodiment

In a sixth example embodiment, an example of the configuration of the terminal number estimating device will be described.

Figure 15:
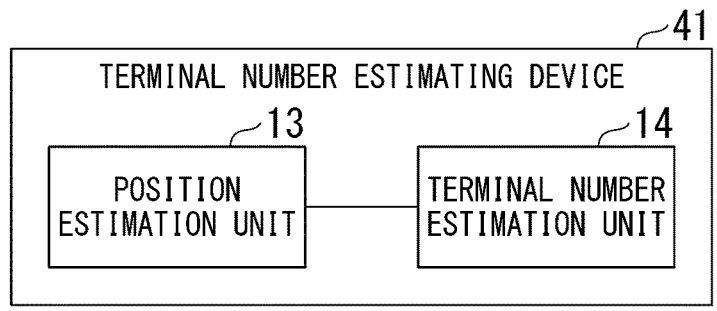
FIG. 15 is a diagram showing an example of a configuration of a terminal number estimating device according to a sixth example embodiment.

FIG. 15 is a diagram showing an example of a configuration of the terminal number estimating device according to the sixth example embodiment. A terminal number estimating device 41 shown in FIG. 15 includes the position estimation unit 13 and the terminal number estimation unit 14.

In such a configuration, the position estimation unit 13 estimates the position of each terminal device that has transmitted the uplink signal on the basis of the discrete Fourier coefficient obtained by performing a discrete Fourier transform on the reception signal of each of the plurality of reception units that receive the uplink signal. The terminal number estimation unit 14 estimates the number of terminal devices based on the position estimation result of each terminal device.

According to the terminal number estimating device 41, the number of terminal devices can be estimated without having to acquire the allocation information of the uplink signal resource to the terminal device 910 (mapping information determined by the base station).

In particular, according to the terminal number estimating device 41, the number of terminal devices can be estimated even if the destination of the uplink signal from the terminal device 910 is not the terminal number estimating device 41. According to the terminal number estimating device 41, in this respect, even if the terminal number estimating device 41 is not the communication partner of the wireless terminal device, useful information is obtained for extracting the signal of each wireless terminal device from the reception signal.

Seventh Example Embodiment

In a seventh example embodiment, an example of the configuration of the specifying processing device will be described.

Figure 16:
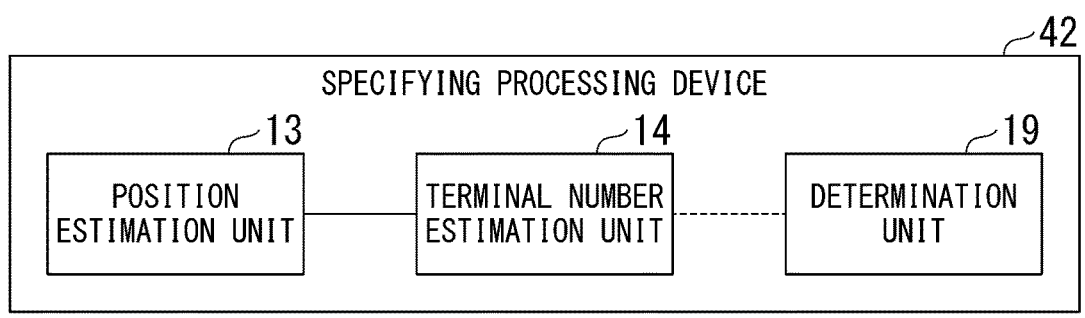
FIG. 16 is a diagram showing an example of a configuration of a specifying processing device according to a seventh example embodiment.

FIG. 16 is a diagram showing an example of the configuration of the specifying processing device according to the seventh example embodiment. A specifying processing device 42 shown in FIG. 16 includes the position estimation unit 13, the terminal number estimation unit 14, and the determination unit 19.

In such a configuration, the position estimation unit 13 estimates the position of each terminal device that has transmitted the uplink signal based on a discrete Fourier coefficient obtained by performing a discrete Fourier transform on the reception signal of each of the plurality of reception units that receive the uplink signal. The terminal number estimation unit 14 estimates the number of terminal devices based on the position estimation result of each terminal device, and estimates the position of the signal of each terminal device in the uplink signal based on the estimation result of the number of terminal devices. For each of the signals clustered in a cluster of the number of terminal devices, the determination unit 19 determines which of the terminal devices estimated for each reception unit the terminal device of a transmitting source of the signal is.

The specifying processing device 42 can specify the terminal device 910 that is a signal transmitting source without the need to acquire allocation information of the uplink signal resource to the terminal device 910 (mapping information determined by the base station). In particular, the specifying processing device 42 can specify the terminal device 910 that is a signal transmitting source even if the destination of the uplink signal from the terminal device 910 is not the specifying processing device 42.

Further, the specifying processing device 42 can determine the identity of the transmitting device by using the feature of the radio wave, but the owner of the transmitting device cannot be directly determined from this feature. In this way, the feature of the radio wave used by the specifying processing device 42 has anonymity, and the specifying processing device 42 can perform processing in consideration of personal privacy.

Figure 17:
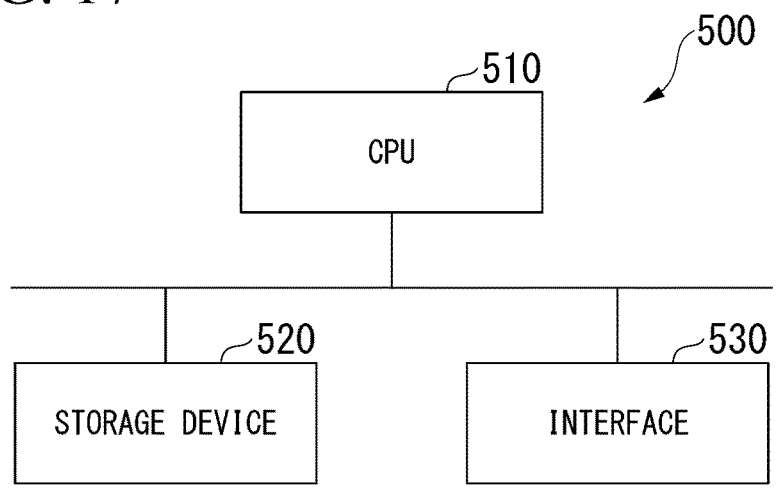
FIG. 17 is a schematic block diagram showing a configuration example of a computer according to at least one example embodiment.

FIG. 17 is a schematic block diagram showing a configuration example of a computer according to at least one example embodiment. In the configuration shown in FIG. 17, the computer 500 includes a CPU 510, a storage device 520, and an interface 530.

When any one or more of the above-mentioned radio wave sensor devices 101a, 101b and 101c is mounted on a computer, the operation of each of the above-mentioned processing units (all or some of the reception unit 11, the Fourier transform unit 12, the signal separation processing unit 15, the feature extraction unit 17, the individual estimation unit 18, the feature database 21, and the power calculation unit 31) are stored in the storage device 520 in the form of a program. The CPU 510 executes the processing of each processing unit by reading the program from the storage device 520 and executing the program. Further, the CPU 510 secures a storage area corresponding to each of the above-mentioned storage units (feature database 21) in the storage device 520 according to the program. The function of the reception unit 11 is executed by the CPU 50 controlling the communication device as the interface 530 according to the program.

When any one or more of the above-mentioned specifying processing devices 102a, 102b, 102c and 42 is mounted on a computer, the operation of each of the above-mentioned processing units (all or some of the position estimation unit 13, the terminal number estimation unit 14, the signal separation processing unit 15, the specifying unit 16, the feature extraction unit 17, the individual estimation unit 18, the determination unit 19, and the feature database 21) are stored in the storage device 520 in the form of a program. The CPU 510 executes the processing of each processing unit by reading the program from the storage device 520 and executing the program. Further, the CPU 510 secures a storage area corresponding to each of the above-mentioned storage units (feature database 21) in the storage device 520 according to the program.

When the above-mentioned terminal number estimating device 41 is mounted on a computer, the operation of each of the above-mentioned processing units (all or some of the position estimation unit 13 and the terminal number estimation unit 14) is stored in the storage device 520 in the form of a program. The CPU 510 executes the processing of each processing unit by reading the program from the storage device 520 and executing the program.

A program for executing all or some of the processing performed by the radio wave sensor devices 101a, 101b and 101c, the specifying processing devices 102a, 102b, 102c and 42, and the terminal number estimating device 41 may be recorded on a computer-readable recording medium, and by reading the program that is recorded on this recording medium into a computer system and running it, each process may be performed. Note that a "computer system" here includes an OS and hardware such as peripheral devices.

Furthermore, the "computer-readable recording medium" refers to a portable medium such as a flexible disk, a magneto-optical disk, ROM, CD-ROM and the like, and a storage device such as a hard disk that is housed in a computer system. The abovementioned program may be one for realizing some of the functions described above, and moreover may be one capable of realizing the abovementioned functions in combination with a program that has already been stored in the computer system.

Although the example embodiments of the present invention have been described in detail with reference to the drawings, specific configurations are not limited to these example embodiments, and designs and the like in a range not deviating from the scope of the present invention are also included.

Some or all of each of the above example embodiments may also be described as, but not limited to, the following supplementary notes.

(Supplementary Note 1)

A terminal number estimating system including:

a plurality of reception units that receive a wireless signal from one or more terminal devices;

a Fourier transform unit that performs a discrete Fourier transform on a reception signal for each reception unit and outputs a discrete Fourier coefficient;

a position estimation unit that estimates a position of each terminal device that is a transmitting source of the wireless signal based on the discrete Fourier coefficient; and a terminal number estimation unit that estimates the number of the terminal devices based on a position estimation result of each terminal device.

(Supplementary Note 2)

A terminal specifying system including:

a plurality of reception units that receive a wireless signal from one or more terminal devices;

a Fourier transform unit that performs a discrete Fourier transform on a reception signal for each reception unit and outputs a discrete Fourier coefficient;

a position estimation unit that estimates a position of each terminal device that is a transmitting source of the wireless signal, based on the discrete Fourier coefficient;

a terminal number estimation unit that estimates the number of the terminal devices based on a position estimation result of each terminal device, and estimates a position of each terminal device that is a transmitting source of the wireless signal among the wireless signal from the one or more terminal devices based on an estimation result of the number of the terminal devices;

a signal separation processing unit that separates a signal of each terminal device from a signal that is the reception signal on which a discrete Fourier transform is performed, based on an estimation result of the position of the signal of each terminal device; and a specifying unit that specifies a terminal device that is a transmitting source of the separated signal.

(Supplementary Note 3)

The terminal specifying system according to supplementary note 2, wherein the terminal number estimation unit clusters each block included in the wireless signal from the one or more terminal devices into any one of the clusters for each terminal device based on the estimation result of the position of the terminal device that is the transmitting source of the signal of the block to estimate the position of the wireless signal of each terminal device among the wireless signal from the one or more terminal devices.

(Supplementary Note 4)

The terminal specifying system according to supplementary note 2 or supplementary note 3, including:

a plurality of radio wave sensor devices and a specifying processing device, wherein the Fourier transform unit includes a plurality of Fourier transform units respectively corresponding to the plurality of reception units, the plurality of radio wave sensor devices include one of the plurality of reception units and one of the plurality of Fourier transform units, and the specifying processing device includes the position estimation unit, the terminal number estimation unit, the signal separation processing unit, and the specifying unit.

(Supplementary Note 5)

A terminal specifying system according to supplementary note 3, including:

a power calculation unit that calculates reception power of each of the plurality reception units for each block included in the wireless signal from the one or more terminal devices, based on the discrete Fourier coefficient, wherein the position estimation unit estimates, for each block, a position of the terminal device that is a transmitting source of the wireless signal of that block based on the reception power.

(Supplementary Note 6)

The terminal specifying system according to supplementary note 5, including:

a plurality of radio wave sensor devices and a specifying processing device, wherein the specifying unit includes:

a feature extraction unit that extracts a feature of a reception signal for each of the plurality of reception units and for each cluster;

an individual estimation unit that estimates a terminal device that is a transmitting source of a wireless signal for each of the plurality of reception units and each cluster, based on the feature; and a determination unit that determines, for each cluster, which of the terminal devices estimated for each reception unit by the individual estimation unit the terminal device that is the transmitting source of the wireless signal is, the Fourier transform unit includes a plurality of Fourier transform units respectively corresponding to the plurality of reception units, the power calculation unit includes a plurality of power calculation units respectively corresponding to the plurality of reception units, the signal separation processing unit includes a plurality of signal separation units respectively corresponding to the plurality of reception units, the feature extraction unit includes a plurality of feature extraction units respectively corresponding to the plurality of reception units, the individual estimation unit includes a plurality of individual estimation units respectively corresponding to the plurality of reception units, each of the plurality of radio wave sensor devices includes one of the plurality of reception units, one of the plurality of Fourier transform units, one of the plurality of power calculation units, one of the plurality of signal separation processing units, one of the plurality of feature extraction units, and one of the plurality of individual estimation units, and the specifying processing device includes the position estimation unit, the terminal number estimation unit, and the determination unit.

(Supplementary Note 7)

The terminal specifying system according to supplementary note 5, including:

a plurality of radio wave sensor devices and a specifying processing device, wherein the specifying unit includes:

a feature extraction unit that extracts a feature of a reception signal for each reception unit and for each cluster;

an individual estimation unit that estimates a terminal device that is a transmitting source of a wireless signal for each reception unit and each cluster, based on the feature; and a determination unit that determines, for each cluster, which of the terminal devices estimated for each reception unit by the individual estimation unit the terminal device that is the transmitting source of the wireless signal is, the Fourier transform unit includes a plurality of Fourier transform units respectively corresponding to the plurality of reception units, the power calculation unit includes a plurality of power calculation units respectively corresponding to the plurality of reception units, the signal separation processing unit includes a plurality of signal separation units respectively corresponding to the plurality of reception units, the feature extraction unit includes a plurality of feature extraction units respectively corresponding to the plurality of reception units, each of the plurality of radio wave sensor devices includes one of the plurality of reception units, one of the plurality of Fourier transform units, one of the plurality of power calculation units, one of the plurality of signal separation processing units, one of the plurality of feature extraction units, and one of the plurality of individual estimation units; and the specifying processing device includes the position estimation unit, the terminal number estimation unit, and the determination unit.

(Supplementary Note 8)

A terminal number estimating device including:

a position estimation unit that estimates a position of each terminal device that is a transmitting source of a wireless signal based on a discrete Fourier coefficient obtained by performing a discrete Fourier transform on each of reception signals of a plurality of reception units that receive the wireless signal from one or more terminal devices; and a terminal number estimation unit that estimates the number of the terminal devices based on a result of estimating a position of each terminal device.

(Supplementary Note 9)

A specifying processing device including:

a position estimation unit that estimates a position of each terminal device that is a transmitting source of a wireless signal based on a discrete Fourier coefficient obtained by performing a discrete Fourier transform on each reception signal of a plurality of reception units that receive the wireless signal from one or more terminal devices;

a terminal number estimation unit that estimates the number of the terminal devices based on a position estimation result of each terminal device, and estimates a position of the wireless signal of each terminal device among the wireless signal from the one or more terminal devices based on a result of estimating the number of the terminal devices; and a determination unit that determines, for each of the signals clustered in a cluster of the number of the terminal devices, which of the terminal devices estimated for each reception unit the terminal device that is the transmitting source of that signal is.

(Supplementary Note 10)

A processing method including:

receiving, by a plurality of reception units, a wireless signal from one or more terminal devices;

performing a discrete Fourier transform on a reception signal for each reception unit and outputting a discrete Fourier coefficient;

estimating a position of each terminal device that is a transmitting source of the wireless signal based on the discrete Fourier coefficient; and estimating the number of the terminal devices based on a position estimation result of each terminal device.

(Supplementary Note 11)

A processing method including:

estimating a position of each terminal device that is a transmitting source of a wireless signal based on a discrete Fourier coefficient obtained by performing a discrete Fourier transform on each of reception signals of a plurality of reception units that receive the wireless signal from one or more terminal devices; and estimating the number of the terminal devices based on a result of estimating a position of each terminal device.

(Supplementary Note 12)

A processing method including:

receiving, by a plurality of reception units, a wireless signal from one or more terminal devices;

performing a discrete Fourier transform on a reception signal for each reception unit and outputting a discrete Fourier coefficient;

estimating a position of each terminal device that is a transmitting source of the wireless signal, based on the discrete Fourier coefficient;

estimating the number of the terminal devices based on a position estimation result of each terminal device, and estimating a position of each terminal device that is a transmitting source of a wireless signal among the wireless signal from the one or more terminal devices based on an estimation result of the number of the terminal devices;

separating a signal of each terminal device from the reception signal on which a discrete Fourier transform is performed, based on an estimation result of the position of the signal of each terminal device; and specifying a terminal device that is a transmitting source of the separated signal.

(Supplementary Note 13)

A processing method including:

estimating a position of each terminal device that is a transmitting source of a wireless signal based on a discrete Fourier coefficient obtained by performing a discrete Fourier transform on each reception signal of a plurality of reception units that receive the wireless signal from one or more terminal devices;

estimating the number of the terminal devices based on a position estimation result of each terminal device, and estimating a position of the signal of each terminal device among the wireless signal from the one or more terminal devices based on a result of estimating the number of the terminal devices; and determining, for each of the signals clustered in a cluster of the number of the terminal devices, which of the terminal devices estimated for each reception unit the terminal device that is the transmitting source of that signal is.

(Supplementary Note 14)

A recording medium that stores a program for causing a computer to execute: estimating a position of each terminal device that is a transmitting source of a wireless signal based on a discrete Fourier coefficient obtained by performing a discrete Fourier transform on each of reception signals of a plurality of reception units that receive the wireless signal from one or more terminal devices; and estimating the number of the terminal devices based on a result of estimating a position of each terminal device.

(Supplementary Note 15)

A recording medium that stores a program for causing a computer to execute:

estimating a position of each terminal device that is a transmitting source of a wireless signal based on a discrete Fourier coefficient obtained by performing a discrete Fourier transform on each reception signal of a plurality of reception units that receive the wireless signal from one or more terminal devices;

estimating the number of the terminal devices based on a position estimation result of each terminal device, and estimating a position of the signal of each terminal device among the wireless signal from the one or more terminal devices based on a result of estimating the number of the terminal devices; and determining, for each of the signals clustered in a cluster of the number of the terminal devices, which of the terminal devices estimated for each reception unit the terminal device that is the transmitting source of that signal is.

This application is based upon and claims the benefit of priority from Japanese Patent Application No. 2018-112198, filed Jun. 12, 2018, the disclosure of which is incorporated herein in its entirety.

INDUSTRIAL APPLICABILITY

The present invention may be applied to a terminal number estimating system, a terminal specifying system, a terminal number estimating device, a terminal specifying device, a processing method, and a recording medium.

REFERENCE SYMBOLS

10: Terminal specifying system
11: Reception unit
12: Fourier transform unit
13: Position estimation unit
14, 14a: Terminal number estimation unit
15: Signal separation processing unit
16: Specifying unit
17: Feature extraction unit
18: Individual estimation unit
19: Determination unit
21: Feature database
31: Power calculation unit
41: Terminal number estimating device
42a, 102a, 102b, 102c: Specifying processing device
101a, 101b, 101c: Radio wave sensor device

What is claimed is:

1. A terminal number estimating system comprising:
a plurality of receivers that receive a wireless signal transmitted from a plurality of terminal devices by frequency-division multiple access;
at least one memory configured to store instructions; and
at least one processor configured execute the instructions to:
perform a discrete Fourier transform on each wireless signal received by the plurality of receivers and outputting a discrete Fourier coefficient; and
estimate a position of each terminal device by clustering a resource block of each wireless signal based on each discrete Fourier coefficient.

2. The terminal specifying system according to claim 1, wherein the at least one processor is configured execute the instructions to:
estimate a number of the terminal devices based on the estimated position of each terminal device, and specify a number or a width of a resource block of each terminal device;
separate a wireless signal for each terminal device from each wireless signal on which the discrete Fourier transform is performed, based on the number of the terminal devices and the number or the width of the resource block of each terminal device; and
extract a feature from the wireless signal separated for each terminal device and specify each terminal device based on the feature of each wireless signal.

3. A specifying processing device comprising:
at least one memory configured to store instructions; and
at least one processor configured execute the instructions to:
perform a discrete Fourier transform on each wireless signal transmitted from a plurality of terminal devices by frequency-division multiple access and received by a plurality of receivers and output a discrete Fourier coefficient; and
estimate a position of each terminal device by clustering a resource block of each wireless signal based on each discrete Fourier coefficient.

4. The specifying processing device according to claim 3, wherein the at least one processor is configured execute the instructions to:
estimate a number of the terminal devices based on the estimated position of each terminal device, and specify a number or a width of a resource block of each terminal device;
separate a wireless signal for each terminal device from each wireless signal on which the discrete Fourier transform is performed, based on the number of the terminal devices and the number or the width of the resource block of each terminal device; and
extract a feature from the wireless signal separated for each terminal device and specify each terminal device based on the feature of each wireless signal.

5. A processing method comprising:
receiving, by a plurality of receivers, a wireless signal transmitted from a plurality of terminal devices by frequency-division multiple access;
performing a discrete Fourier transform on each wireless signal received by the plurality of receivers and outputting a discrete Fourier coefficient; and
estimating a position of each terminal device by clustering a resource block of each wireless signal based on each discrete Fourier coefficient.

6. The processing method according to claim 5, comprising:
outputting a number of the terminal device and a number or a width of a resource block of each terminal device, based on the estimated position of each terminal device by the clustering;
separating a wireless signal for each terminal device from each wireless signal on which the discrete Fourier transform is performed, based on the number of the terminal devices and the number or the width of the resource block of each terminal device;
extracting a feature from the wireless signal separated for each terminal device; and
specifying each terminal device based on the feature of each wireless signal.

* * * * *